(12) United States Patent
Kurobe et al.

(10) Patent No.: US 7,773,498 B2
(45) Date of Patent: *Aug. 10, 2010

(54) TRANSMITTING/RECEIVING APPARATUS, METHOD, PROGRAM, RECORDING MEDIUM, AND INTEGRATING CIRCUIT USED IN COMMUNICATION NETWORK

(75) Inventors: Akio Kurobe, Tondabayashi (JP); Koji Ikeda, Kadoma (JP); Gou Kuroda, Izumisano (JP); Kensuke Yoshizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 747 days.

This patent is subject to a terminal disclaimer.

(21) Appl. No.: 11/604,232

(22) Filed: Nov. 27, 2006

(65) Prior Publication Data

US 2007/0121482 A1 May 31, 2007

Related U.S. Application Data

(62) Division of application No. 10/844,328, filed on May 13, 2004, now Pat. No. 7,158,473.

(30) Foreign Application Priority Data

May 16, 2003 (JP) .............................. 2003-139359

(51) Int. Cl.
*H04J 9/00* (2006.01)
(52) U.S. Cl. ...................... 370/204; 370/207
(58) Field of Classification Search ................. 370/342, 370/397, 347, 236, 320, 473, 204, 207; 455/73; 375/222; 341/50, 60

See application file for complete search history.

(56) References Cited

U.S. PATENT DOCUMENTS 5,764,699 A 6/1998 Needham et al.

(Continued)

FOREIGN PATENT DOCUMENTS

DE 101 22 698 11/2002

(Continued)

OTHER PUBLICATIONS

Adaptive digital communication receivers; Haykin, S.; Communications Magazine, IEEE vol. 38 , Issue: 12 Digital Object Identifier: 10.1109/35.888264 Publication Year: 2000 , pp. 106-114.*

(Continued)

*Primary Examiner*—Salman Ahmed
(74) *Attorney, Agent, or Firm*—Wenderoth, Lind & Ponack, L.L.P.

(57) ABSTRACT

A transmitting/receiving apparatus includes a packet construction section for dividing continuous data into a plurality of subpackets, and constructing a packet by concatenating the plurality of subpackets; a modulation transmission section for modulating the constructed packet, and transmitting the modulated packet to another apparatus; a training session execution section for checking channel conditions, when a predetermined condition is satisfied, and changing a modulation rule; and a subpacket transmission confirmation section for confirming whether or not a subpacket included in the transmitted packet is transmitted successfully to the transmission destination apparatus. If the modulation rule is changed by the training session execution section, the packet construction section reconstructs a new packet by concatenating a subpacket, which is confirmed as an unsuccessfully-transmitted subpacket, with subpackets newly generated from the continuous data, and the modulation transmission section modulates the reconstructed new packet, and transmits the modulated packet.

11 Claims, 14 Drawing Sheets

U.S. PATENT DOCUMENTS

| | | | | |
|---|---|---|---|---|
| 5,768,269 | A * | 6/1998 | Rakib et al. | 370/342 |
| 5,966,376 | A * | 10/1999 | Rakib et al. | 370/342 |
| 6,188,873 | B1 | 2/2001 | Wickman et al. | |
| 6,266,334 | B1 * | 7/2001 | Duckwall | 370/397 |
| 6,388,999 | B1 | 5/2002 | Gorsuch et al. | |
| 6,690,751 | B1 | 2/2004 | Nikula et al. | |
| 6,714,520 | B1 | 3/2004 | Okamura | |
| 7,158,473 | B2 * | 1/2007 | Kurobe et al. | 370/204 |
| 2002/0105938 | A1 * | 8/2002 | Suzuki | 370/347 |
| 2002/0159545 | A1 | 10/2002 | Ramesh et al. | |
| 2002/0176362 | A1 * | 11/2002 | Yun et al. | 370/236 |
| 2003/0039220 | A1 * | 2/2003 | Kwak | 370/320 |
| 2004/0022176 | A1 | 2/2004 | Hashimoto et al. | |
| 2004/0192218 | A1 * | 9/2004 | Oprea | 455/73 |
| 2005/0058154 | A1 * | 3/2005 | Lee et al. | 370/473 |
| 2005/0184887 | A1 * | 8/2005 | Jaffe et al. | 341/50 |
| 2005/0220180 | A1 * | 10/2005 | Barlev et al. | 375/222 |
| 2006/0050623 | A1 | 3/2006 | Hartman, Jr. | |
| 2006/0250285 | A1 * | 11/2006 | Jaffe et al. | 341/60 |

FOREIGN PATENT DOCUMENTS

| | | |
|---|---|---|
| DE | 101 47 951 | 3/2003 |
| EP | 1489787 A1 * | 12/2004 |
| JP | 6-232871 | 8/1994 |
| JP | 11-252035 | 9/1999 |
| JP | 2000-134680 | 5/2000 |
| JP | 2000-188609 | 7/2000 |
| JP | 2001-86137 | 3/2001 |
| JP | 2002-44002 | 2/2002 |
| JP | 2003-32745 | 1/2003 |

OTHER PUBLICATIONS

Capacity of a band-limited CDMA MMSE receiver-based system when combined with trellis or convolutional coding Oppermann, I.; Rapajic, P.B.; Communications, IEEE Transactions on vol. 48 , Issue: 8 Digital Object Identifier: 10.1109/26.864170 Publication Year: 2000 , pp. 1328-1337.*

Sobia Baig et al., "A Discrete Multitone Transceiver at the Heart of the PHY Layer of an In-Home Power Line Communication Local Area Network", IEEE Communications Magazine, Apr. 2003, pp. 48-53.

Jose Abad et al., "Extending the Power Line LAN Up to the Neighborhood Transformer", IEEE Communications Magazine, Apr. 2003, pp. 64-70.

Justin Chuang et al. Beyond 3G: Wideband Wireless Data Access Based on OFDM and Dynamic Packet Assignment, IEEE Communications Magazine, Jul. 2000, vol. 38, Issue 7, pp. 78-87.

* cited by examiner

FIG. 1
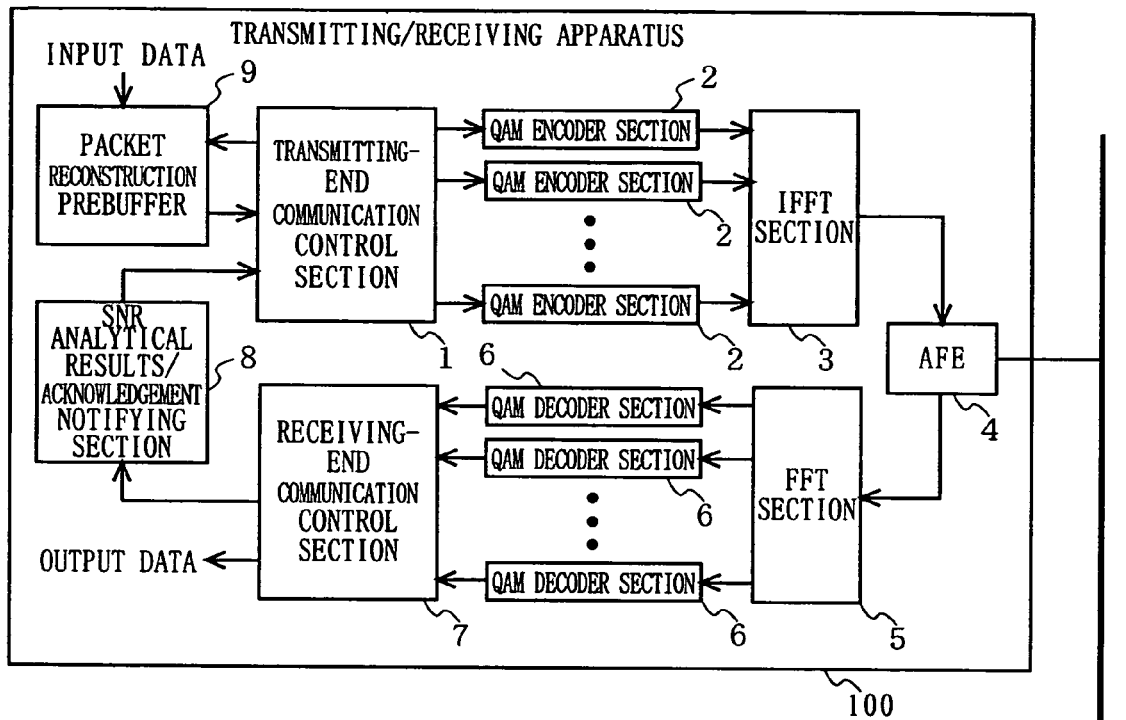
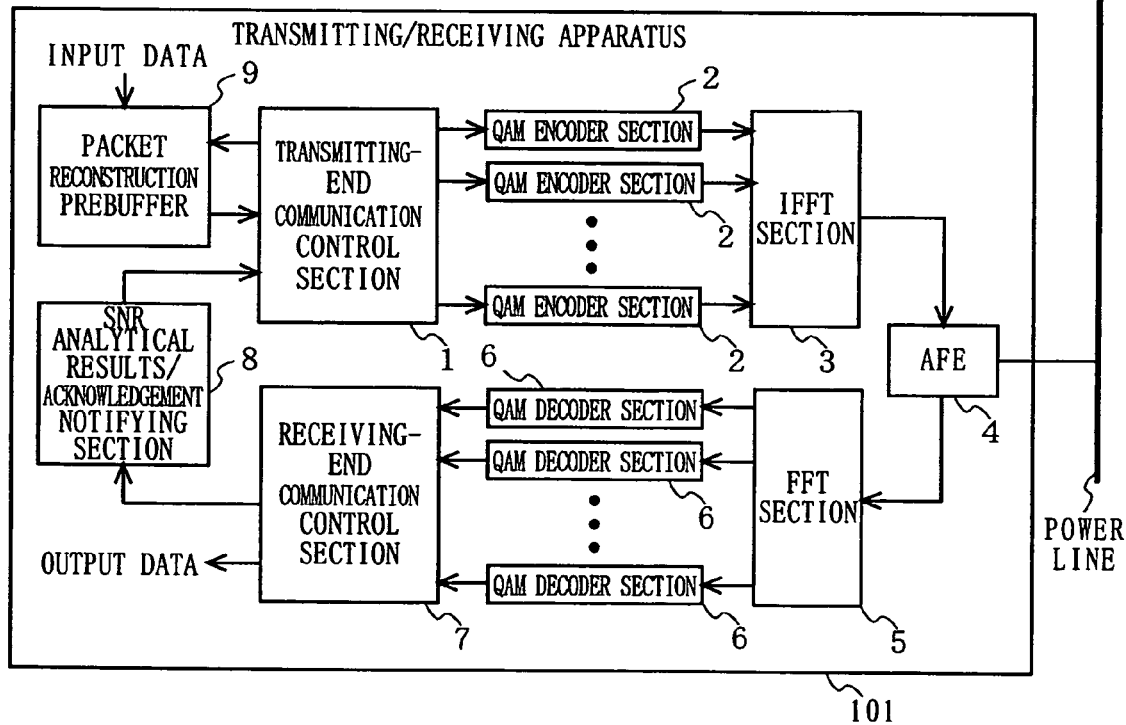

FIG. 4
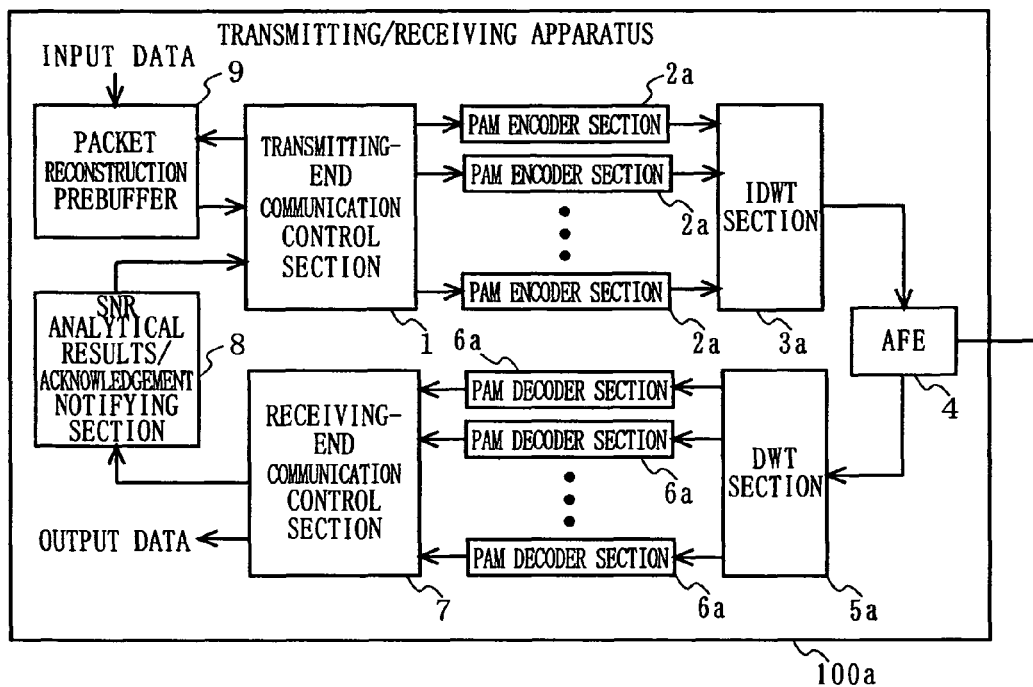
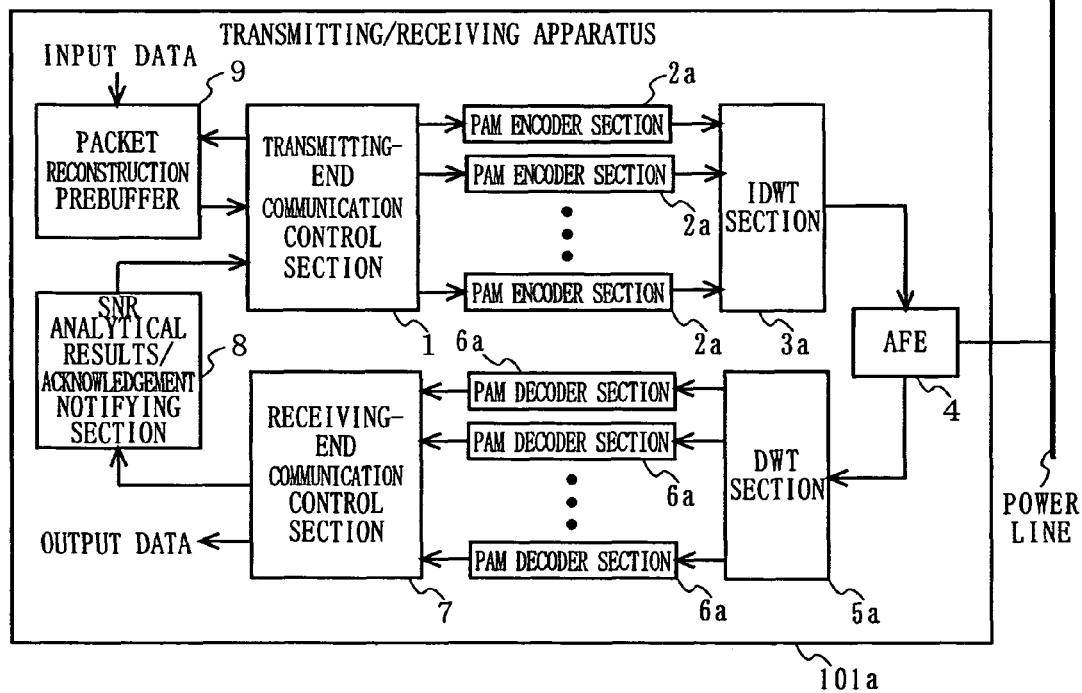

FIG. 5
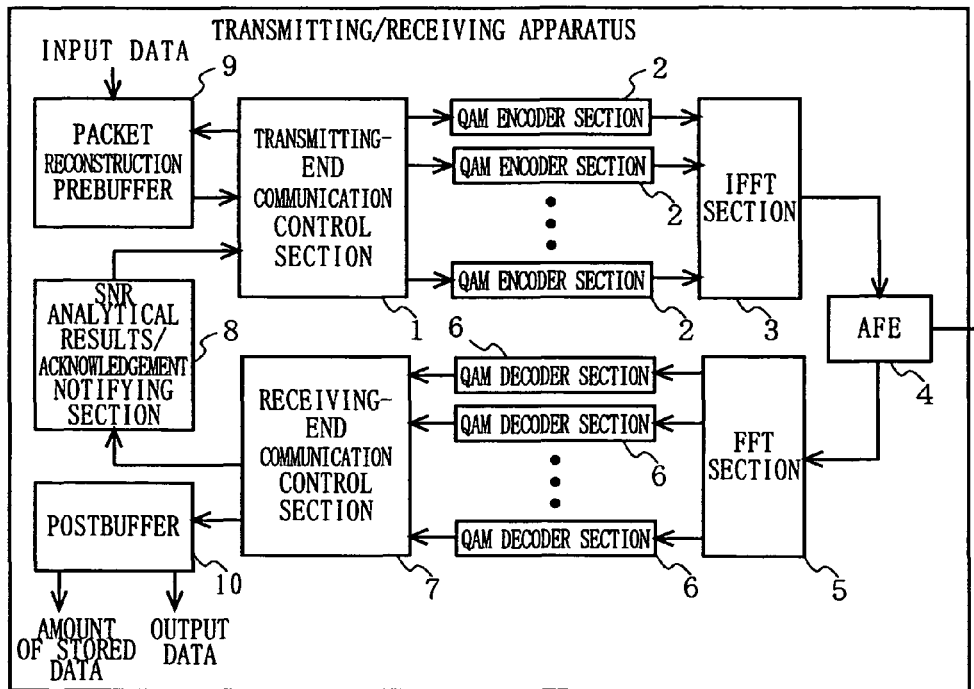
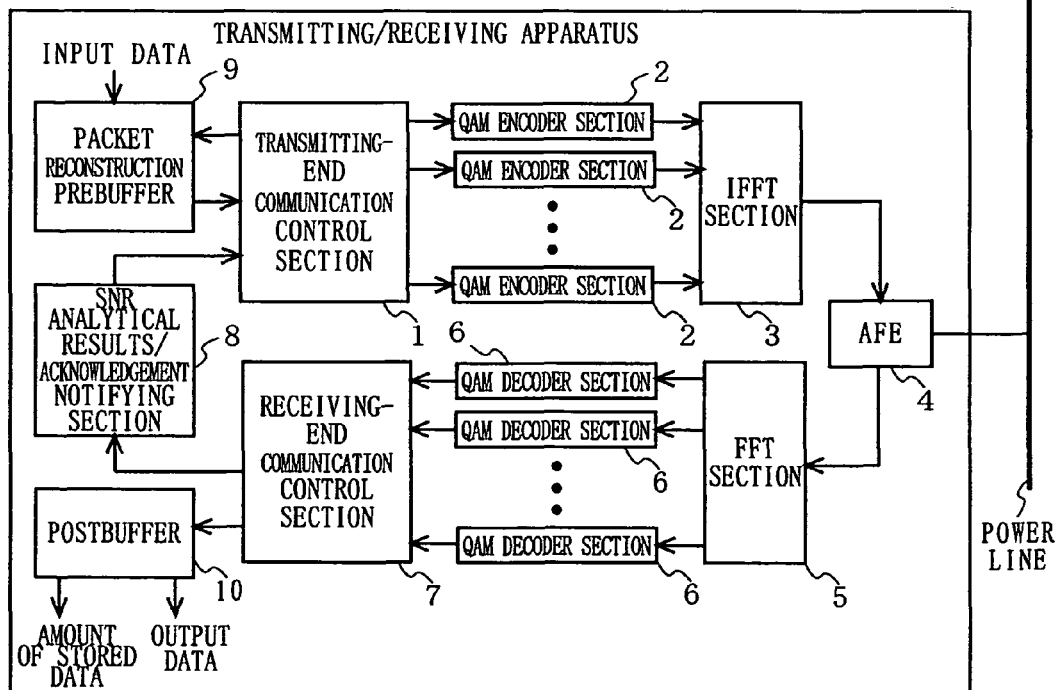

INITIAL STATE

FROM READING START STATE TO STEADY STATE

DURING TRAINING SESSION

FIG. 7
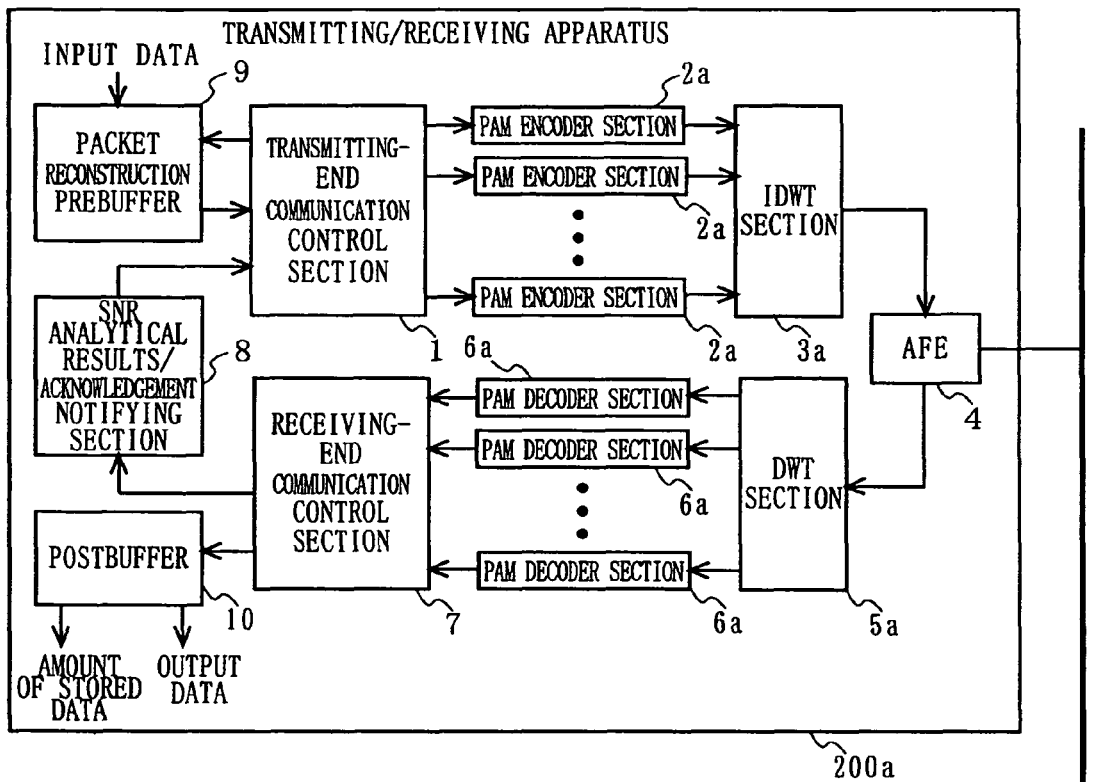
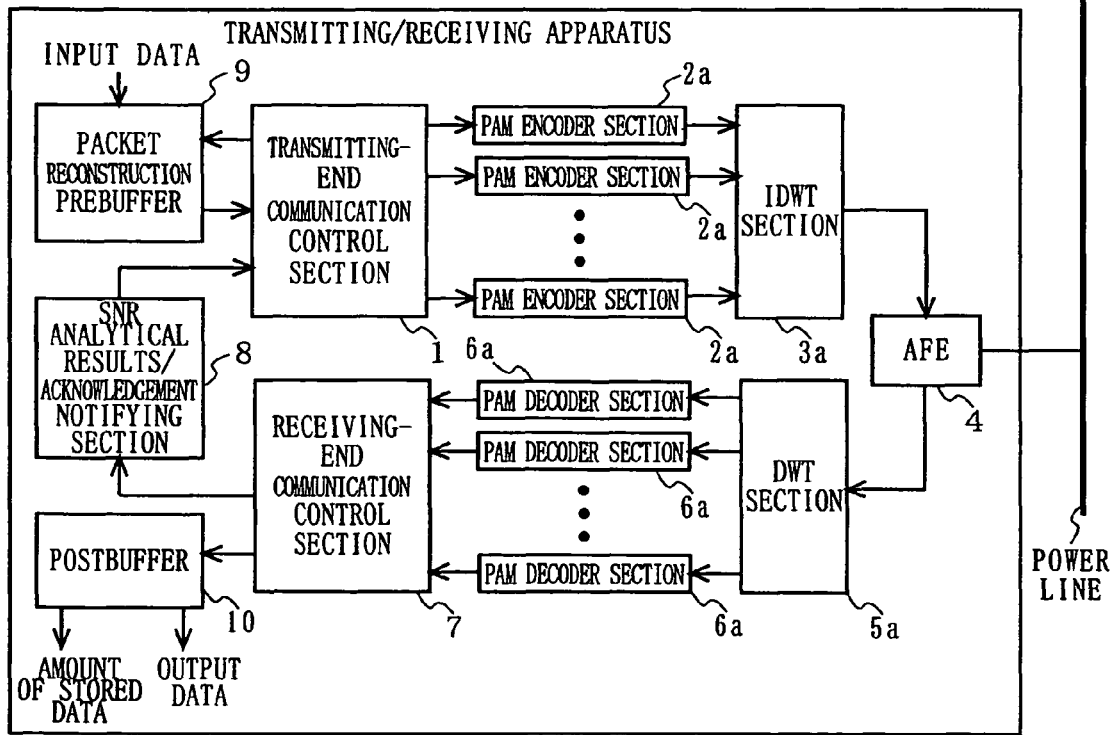

FIG. 8
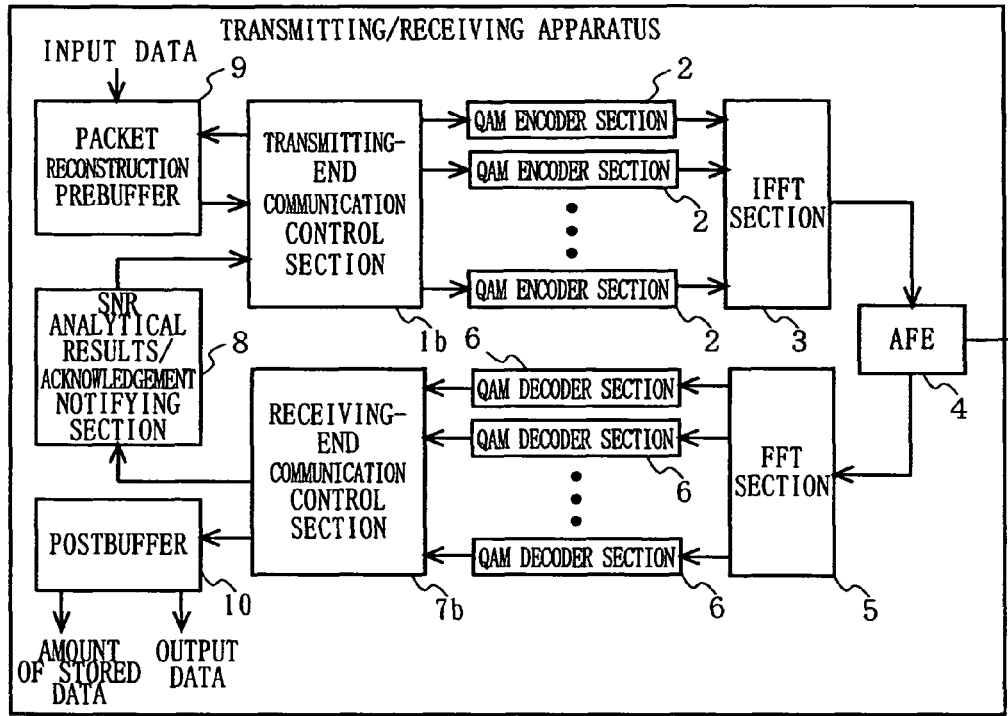
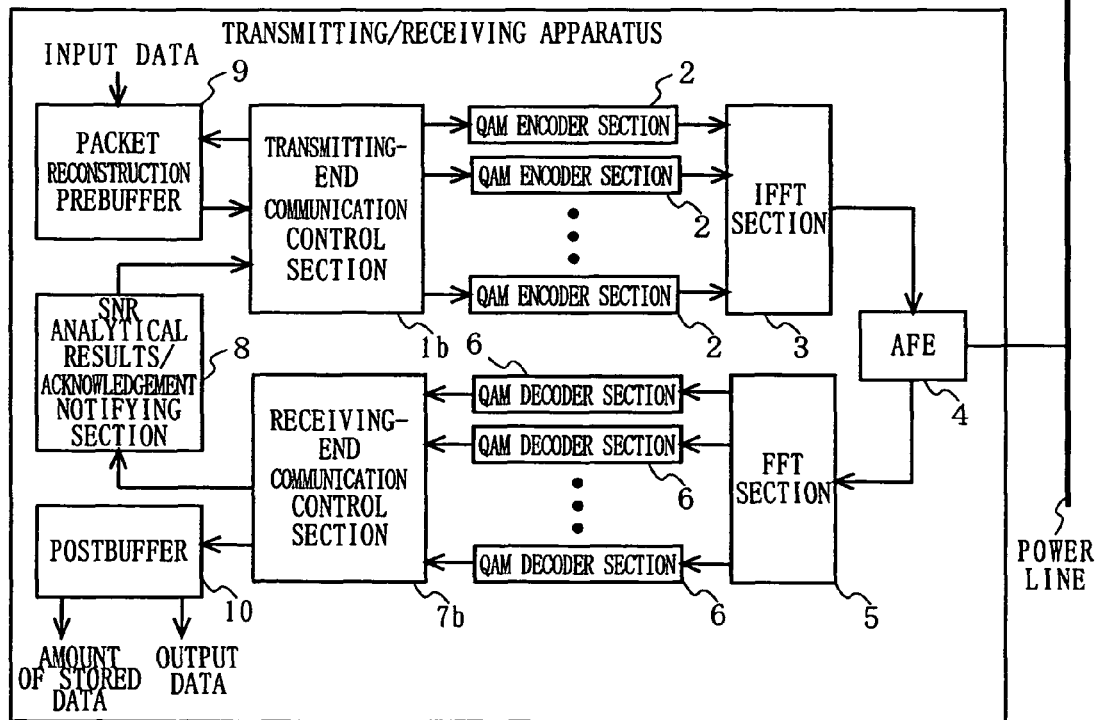

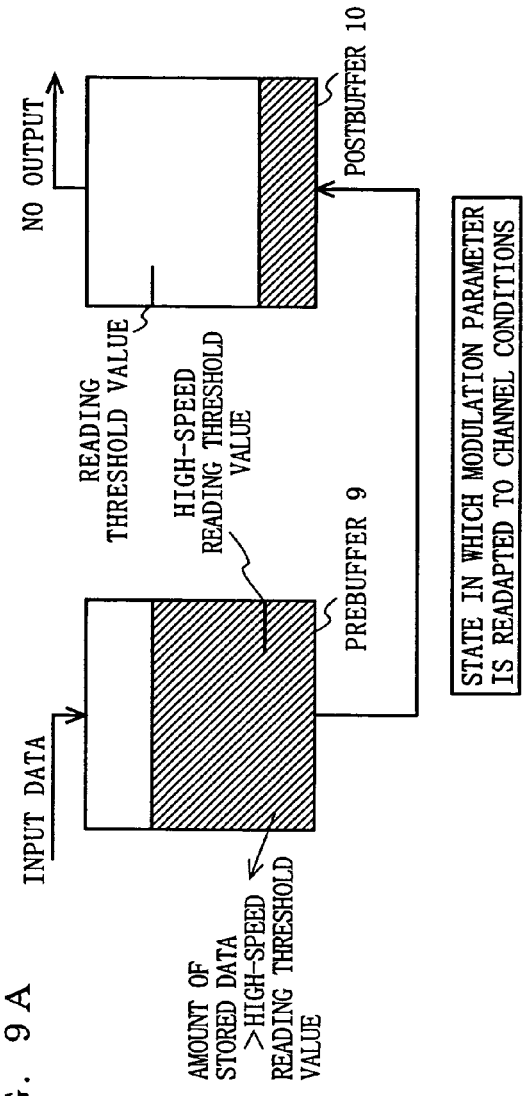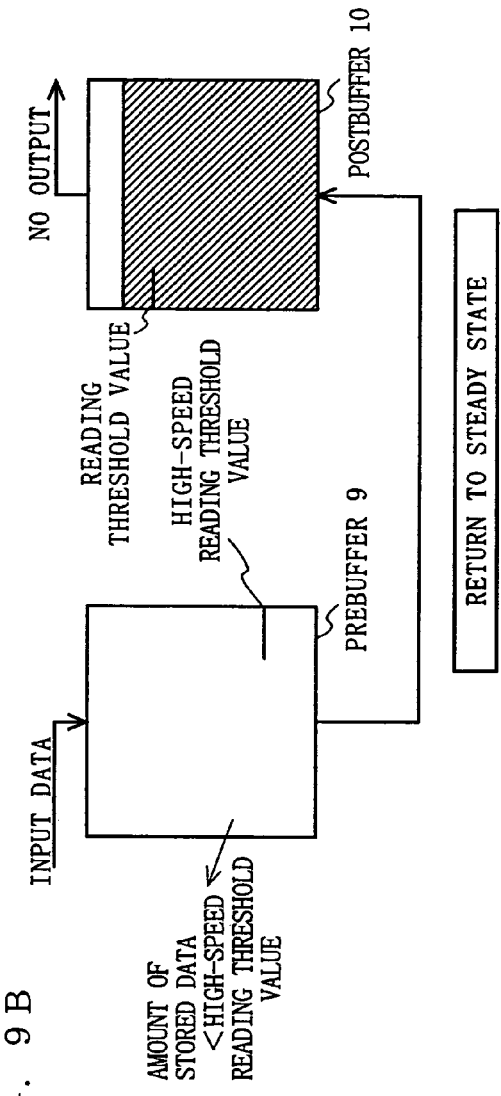

FIG. 10
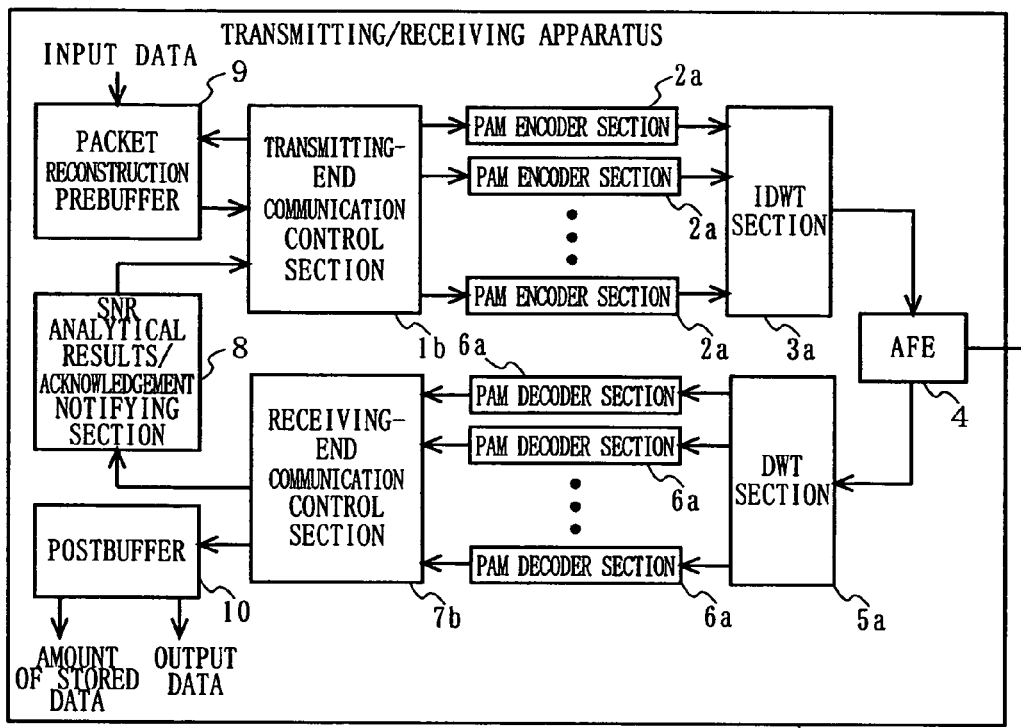
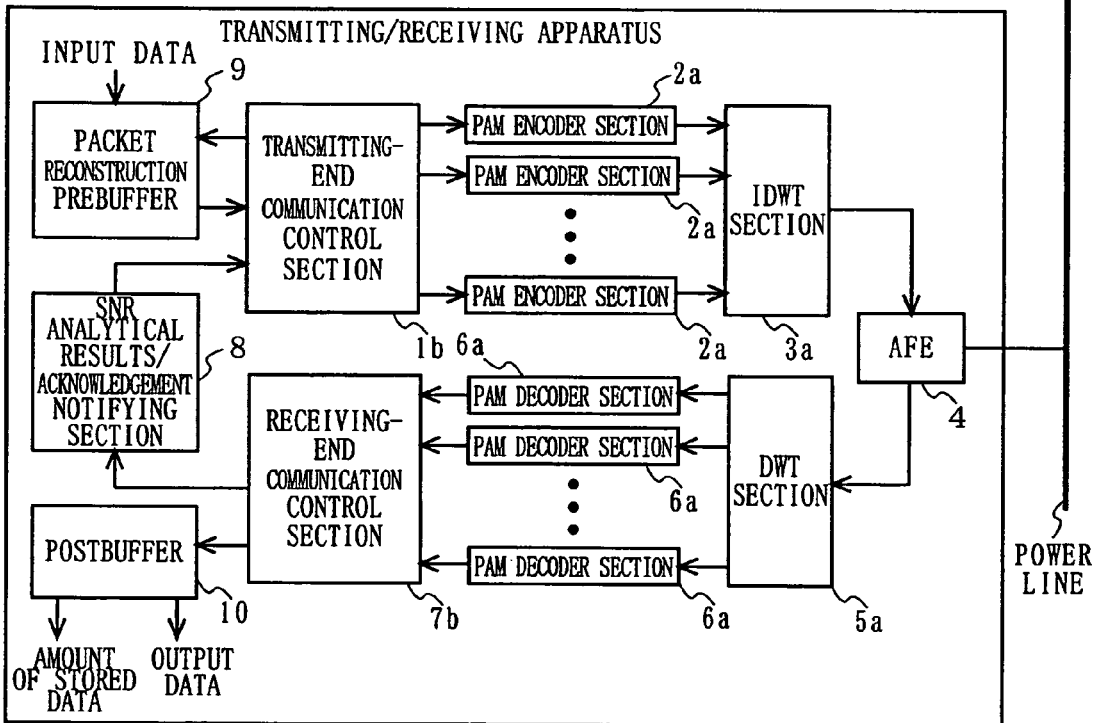

TRANSMITTING/RECEIVING APPARATUS, METHOD, PROGRAM, RECORDING MEDIUM, AND INTEGRATING CIRCUIT USED IN COMMUNICATION NETWORK

This is a Rule 1.53(b) Divisional Application of Ser. No. 10/844,328, filed May 13, 2004 now U.S. Pat. No. 7,158,473.

BACKGROUND OF THE INVENTION

1. Field of the Invention

The present invention relates to a transmitting/receiving apparatus used in a communication network system in which data is packetized and transmitted between a plurality of terminals. More particularly, the present invention relates to a transmitting/receiving apparatus used in a communication network system in which continuous video data such as MPEG2-TS is packetized and transmitted.

2. Description of the Background Art

In recent years, a wireless LAN system and a power line communication system, for example, are in practical use as a communication network system in which data is packetized and transmitted between a plurality of terminals. As a wireless LAN system, IEEE 802.11b using 2.4 GHz, and IEEE 802.11a using 5 GHz are standardized, and are widely prevalent. The above-described wireless LAN systems employ a fall down algorithm by which an appropriate modulation method is selected from among different types of modulation methods in accordance with transmission conditions. The fall down algorithm reduces a communication speed in accordance with transmission conditions. IEEE 802.11a provides 54 Mbps transmission speed by using 64 QAM, but its communication range and noise immunity are substantially inferior to a modulation method such as 16 QAM. Thus, the wireless LAN system changes a modulation method according to transmission conditions, thereby continuing communication.

On the other hand, HomePlug1.0, which is a standard of a communication system by which 14 Mbps communication is realized by using a home power line, is developed by Home-Plug Powerline Alliance, and is in practical use (see Sobia Baig et al., "A Discrete Multitone Transceiver at the Heart of the PHY Layer of an In-Home Power Line Communication Local Area Network", IEEE Communications Magazine, April 2003, pp. 48-53).

FIG. 12 is a block diagram showing a structure of a transmitting/receiving apparatus 90 defined by HomePlug1.0. In FIG. 12, the transmitting/receiving apparatus 90 includes a transmitting-end communication control section 91, a plurality of QAM encoder sections 92, an IFFT section 93, an AFE (Analog Front End) 94, an FFT section 95, a plurality of QAM decoder sections 96, a receiving-end communication control section 97, and an SNR analytical results/acknowledgement notifying section 98.

The transmitting-end communication control section 91 determines how to allocate a bit string of input data to the QAM encoder section(s) 92 based on SNR analytical results notified by the SNR analytical results/acknowledgement notifying section 98. The transmitting-end communication control section 91 allocates a bit string of input data to each QAM encoder section 92 in accordance with an allocation scheme determined based on the SNR analytical results. That is, the transmitting-end communication control section 91 performs serial-to-parallel conversion for input data in accordance with an allocation scheme determined based on the SNR analytical results. The transmitting-end communication control section 91, which is provided with a buffer for temporarily storing input data, temporarily stores input data in the buffer. Then, the transmitting-end communication control section 91 performs serial-to-parallel conversion for the temporarily stored input data in accordance with a timing output from an external QoS (Quality of Service) controller (not shown), and outputs the converted data. In the case where transmitted data is not received successfully, the transmitting-end communication control section 91 retransmits the temporarily stored input data in accordance with an acknowledgement notified by the SNR analytical results/acknowledgement notifying section 98.

A transmitting source transmitting/receiving apparatus and a transmission destination transmitting/receiving apparatus perform a process for changing a bit allocation scheme based on the SNR analytical results in a coordinated manner. Specifically, the transmission source transmitting/receiving apparatus transmits a test packet to the transmission destination transmitting/receiving apparatus. In response to this, the transmission destination transmitting/receiving apparatus analyzes an SNR (Signal to Noise Ratio) of each carrier based on the transmitted test packet. The above-described SNR of each carrier is sent back to the transmission source transmitting/receiving apparatus as SNR analytical results. Based on the transmitted SNR analytical results, the transmission source transmitting/receiving apparatus determines a bit number allocated to each carrier. Hereinafter, the above-described process is referred to as a training session.

Each QAM encoder section 92 converts a bit string input from the transmitting-end communication control section 91 to an amplitude value and a phase value by using QAM (Quadratture Amplitude Modulation).

The IFFT section 93 executes an inverse Fast Fourier transform based on the amplitude value and the phase value input from each QAM encoder section 92, and outputs its results. Thus, an OFDM signal modulated in accordance with the input data is output. The above-described OFDM signal is transmitted to another transmitting/receiving apparatus via the AFE 94.

The FFT section 95 performs a Fast Fourier transform for the OFDM signal received from another transmitting/receiving apparatus via the AFE 94, and outputs an amplitude value and a phase value of each carrier.

Each QAM decoder section 96 demodulates the amplitude value and the phase value, which is output from the FFT section 95, back into a bit string by using QAM, and outputs the bit string.

The receiving-end communication control section 97 converts the bit string output from each QAM decoder section 96 to a continuous bit string, and outputs the continuous bit string as output data. That is, the receiving-end communication control section 97 performs parallel-to-serial conversion, thereby outputting output data. Also, the receiving-end communication control section 97 analyzes an SNR of each carrier based on the amplitude value and the phase value output from each QAM decoder 96 during the training session. The receiving-end communication control section 97 notifies the SNR analytical results to the transmitting-end communication control section 91 via the SNR analytical results/acknowledgement notifying section 98. The receiving-end communication control section 97 checks whether or not all packets transmitted from the transmission source transmitting/receiving apparatus are received successfully based on the generated output data. The above-described checking process is referred to as an acknowledgement. The receiving-end communication control section 97 notifies acknowledgment results to the transmitting-end communication control section 91 via the SNR analytical results/acknowledgement notifying section 98.

The transmitting/receiving apparatus 90 shown in FIG. 12, which is compliant with HomePlug1.0, divides a data string into a lot of low rate data, and allocates the divided data to a lot of sub-carriers, each of which is orthogonal to others, for transmission. The receiving-end communication control section 97 uses a channel estimation algorithm, which is executed during a training session, for measuring an SNR in accordance with a specific frame transmitted from a transmission source. The channel estimation algorithm changes a modulation speed by estimating channel conditions. By conventional HomePlug1.0 specifications, a plurality of sub-carriers are modulated in a similar manner by selecting a single modulation parameter. However, newly performed researches have revealed that further speeding-up is realized using a method called DMT (Discrete Multitone), by which a bit number to be allocated to each carrier is determined by the transmitting-end communication control section 91 in accordance with each carrier's SNR fed back thereto.

FIGS. 13A to 13C are illustrations for describing a basic concept of DMT. In FIG. 13A, sub-carriers are denoted by numerals 1 to n, a horizontal axis indicates a frequency, and a vertical axis indicates a bit number (i.e., speed) allocated to each carrier. FIG. 13A shows that the sub-carriers are in the same state.

FIG. 13B is an illustration showing an exemplary SNR analyzed in a transmission destination. In FIG. 13B, a horizontal axis indicates a frequency, and a vertical axis indicates an SNR value.

In the case of the SNR as shown in FIG. 13B, the transmitting-end communication control section 91 allocates a greater number of bits to a sub-carrier with a frequency of higher SNR values, and does not allocate any bits to a sub-carrier with SNR values smaller than a predetermined threshold value (SNR threshold), as shown in FIG. 13C. As such, the transmitting-end communication control section 91 controls the bit allocation scheme applied to the QAM encoder sections 92 based on the SNR analytical results, thereby changing a modulation method to transmit data without transmission errors.

The SNR is decreased by the following factors, for example: load conditions depending on a status of a device connected to a power line, noise, narrow-band noise of an amateur radio and a short-wave radio, etc., and attenuation of a signal (see Jose Abad et al., "Extending the Power Line LAN Up to the Neighborhood Transformer", IEEE Communications Magazine, April 2003, pp. 64-70). The above-described factors change in accordance with wiring conditions, and a connection status or an operation status of a device. The factors may change on a minute-by-minute, hour-by-hour, day-by-day, or year-by-year basis.

In the conventional wireless LAN system and the power line communication system, a modulation parameter is appropriately changed by the fall down algorithm, the channel estimation algorithm, or the like. As such, a transmission speed is adjusted so as to avoid errors, thereby achieving the maximum throughput under the current transmission conditions.

In the above-described systems, a training session may be performed before communication is started. During the training session, it is necessary to perform a sequence of processes such that a specific packet (a test packet) is transmitted from a transmission source, and a feedback packet (SNR analytical results) is sent back from a transmission destination. Thus, frequent training sessions increase overhead, whereby communication speed is reduced irrespective of transmission conditions. In order to avoid such reduction in communication speed, a training session may be performed at regular intervals, for example, in a cycle of five seconds. However, the channel conditions and the above-described cycle are not synchronized. As a result, if the channel conditions change during a cycle, communication is interrupted until a next cycle is started. In the case where a training session is performed in a cycle of five seconds, for example, communication may be interrupted as much as five seconds in the worst case.

Thus, even when a training session is being performed at regular intervals, a cycle thereof may be changed to an irregular cycle in the case where communication conditions are degraded due to a change in channel conditions.

In the wireless LAN system and the power line communication system, automatic retransmission control is performed by using ARQ (Automatic Repeat reQuest). Thus, it is possible to determine that the communication conditions are degraded if the number of automatic retransmission exceeds a predetermined threshold value.

However, if the number of ARQ retransmission exceeds a predetermined threshold value, a packet is discarded without being transmitted.

FIG. 14 is a flowchart showing an operation performed before a training session is started in the conventional power line communication system. Hereinafter, with reference to FIG. 14, the operation performed before a training session is started in the conventional power line communication system will be described.

First, the transmitting-end communication control section 91 sets a training cycle Tt0 (step S91). In this example, Tt0 is five seconds.

Next, the transmitting-end communication control section 91 sets a threshold value Nr0 of a retransmission number (step S92). Next, the transmitting-end communication control section 91 resets a retransmission number counter Nr to zero (step S93): Then, the transmitting-end communication control section 91 resets a timer Tt, which counts a training cycle, to zero (step S94).

Next, the transmitting-end communication control section 91 generates a packet to be transmitted from input data (step S95). Then, the transmitting-end communication control section 91 checks the timer Tt, which counts a training cycle, to find out if Tt0 seconds have elapsed (step S96).

If Tt0 seconds have not elapsed, the transmitting-end communication control section 91 determines whether or not the retransmission number counter Nr is equal to the retransmission number threshold value Nr0 (step S97). If the retransmission number counter Nr is not equal to the retransmission number threshold value Nr0, the transmitting-end communication control section 91 checks the presence or absence of an acknowledgement (step S80). If an acknowledgement is not received within a predetermined time period, the transmitting-end communication control section 91 retransmits the packet generated at step S95, increments the retransmission number counter Nr by 1 (step S98), and goes back to step S96. If an acknowledgement is received at step S80, the transmitting-end communication control section 91 goes back to step S93. On the other hand, if the retransmission number counter Nr is equal to the retransmission number threshold value Nr0 at step S97, the transmitting-end communication control section 91 discards the generated packet (step S99), executes a training session (step S90), and goes back to step S93.

On the other hand, if it is determined that Tt0 seconds have elapsed by checking the timer Tt, which counts a training cycle, at step S96, the transmitting-end communication control section 91 executes a training session (step S90), and goes back to step S93.

As such, when the retransmission number exceeds a predetermined threshold value, the conventional transmitting/receiving apparatus discards a packet, and proceeds to a training session. Also, the conventional transmitting/receiving apparatus automatically executes a training session when a predetermined training cycle has elapsed.

In the case where TCP/IP, which is used in the Internet, is used as a higher layer protocol, even if a lower layer discards data, a TCP layer detects packet loss, and causes the data to be retransmitted by using ARQ. However, it is impossible to use ARQ, which is used in TCP, for transmission of real-time video data since ARQ prevents the video data from being transmitted in real time. Thus, UDP, which does not use ARQ, is used in place of TCP. In this case, the packet discarded in the lower layer is not re-obtained, whereby a screen is distorted due to video data loss. The percentage of discarded packets can be reduced by increasing a threshold value of the ARQ retransmission number in the lower layer. However, as is the case with ARQ used in TCP, the increased threshold value of the ARQ retransmission number prevents the video data from being transmitted in real time.

Note that Japanese Patent Laid-Open Publication No. H6-232871 discloses a technique by which a transmission source wireless terminal, which has received a retransmission request packet from a destination wireless terminal, determines a bit string to be retransmitted based on retransmission request carrier information included in the received retransmission request packet, generates a retransmission packet, and transmits the retransmission packet to the destination wireless terminal using a carrier frequency, at which communication is possible, determined based on successfully-received carrier information. In the case where the number of bit string to be retransmitted is one, the transmission source wireless terminal sends a retransmission packet in parallel using all carrier frequencies, at which communication is possible. Also, in the case where the number of bit strings to be retransmitted is two and the number of carriers, at which communication is possible, is one, the transmission source wireless terminal sends the retransmission packet twice using one carrier frequency, at which communication of these two bit strings is possible. The above-described invention is based on the premise that all carriers have the same modulation speed, thereby retransmitting data, which was transmitted on an carrier affected by fading, on a different carrier. As such, the above-described invention can be used to prevent a repetition of retransmission. However, by the above-described invention, it is not possible to select an optimum modulation for each carrier in accordance with channel conditions.

SUMMARY OF THE INVENTION

Therefore, an object of the present invention is to provide a transmitting/receiving apparatus capable of preventing data loss while ensuring the maximum throughput in accordance with channel conditions.

The present invention has the following features to attain the object mentioned above.

A first aspect of the present invention is directed to a transmitting/receiving apparatus for packetizing input continuous data and transmitting the packetized data to another apparatus on a communication network, and receiving a packet transmitted from another apparatus. The transmitting/receiving apparatus comprises a packet construction section for dividing the continuous data into a plurality of subpackets, and constructing a packet by concatenating the plurality of subpackets; a modulation transmission section for modulating the packet constructed by the packet construction section, and transmitting the modulated packet to another apparatus on the communication network; a training session execution section for checking channel conditions, when a predetermined condition is satisfied, by communicating with another apparatus, and changing a modulation rule used in the modulation transmission section so that a packet transmitted from the modulation transmission section is successfully transmitted to a transmission destination apparatus; and a subpacket transmission confirmation section for confirming whether or not a subpacket included in the transmitted packet is transmitted successfully to the transmission destination apparatus. If the modulation rule is changed by the training session execution section, the packet construction section reconstructs a new packet by concatenating a subpacket, which is confirmed as an unsuccessfully-transmitted subpacket by the subpacket transmission confirmation section, with subpackets newly generated from the continuous data, and the modulation transmission section modulates the reconstructed new packet in accordance with the changed modulation rule, and transmits the modulated packet.

As a result, after a training session is executed and a modulation rule is changed, a subpacket (s) whose acknowledgement is not received is concatenated with new subpackets generated from continuous data, and is transmitted as a new packet. Thus, even if there is a subpacket(s) which is transmitted unsuccessfully due to poor channel conditions, the above-described subpacket(s) and new subpackets are transmitted, whereby it is possible to provide a transmitting/receiving apparatus capable of preventing data loss while ensuring the maximum throughput in accordance with the channel conditions.

Preferably, if the subpacket transmission confirmation section may confirm that at least one subpacket included in the transmitted packet is not transmitted successfully to the transmission destination apparatus, the packet construction section may reconstruct a new packet by concatenating the at least one subpacket, which is confirmed by the subpacket transmission confirmation section as an unsuccessfully-transmitted subpacket, with subpackets newly generated from the continuous data, and the modulation transmission section may modulate the reconstructed new packet, and transmit the modulated packet.

As a result, a subpacket(s) whose acknowledgement is not received is concatenated with new subpackets, and is transmitted, whereby it is possible to prevent data loss.

For example, the predetermined condition may be satisfied when a number of packet retransmission performed by the modulation transmission section exceeds a predetermined upper limit.

As a result, in the case where an acknowledgement is not received even if a packet is retransmitted predetermined times, a training session is executed in order to change a modulation rule, whereby it is possible to transmit a subpacket successfully.

For example, the predetermined condition may be satisfied when a predetermined training cycle has elapsed.

As a result, a training session is executed at regular intervals, whereby it is possible to perform packet transmission in accordance with the current channel conditions.

Preferably, a prebuffer for storing the continuous data to be input during the execution of a training session, which is performed by the training session execution section for changing a modulation rule used in the modulation transmission section, may be further included.

As a result, data is stored even when a training session is being executed, whereby it is possible to uninterruptedly transmit data to another apparatus.

Preferably, a wider bandwidth request section for requesting, when the amount of the continuous data stored in the prebuffer exceeds a predetermined threshold value, and a management device, which manages a bandwidth assigned to a channel, to widen an assigned bandwidth may be further included.

As a result, data stored in the prebuffer is transmitted to another apparatus as fast as possible, whereby it is possible to prevent data loss when it is reproduced in another apparatus.

For example, the management device may assign a bandwidth to each apparatus on the communication network in accordance with a reservation made by each apparatus, and the wider bandwidth request section may make a reservation with the management device so as to set a bandwidth faster than an input speed of the continuous data.

As a result, a wide bandwidth is reserved, whereby it is possible to transmit data stored in the prebuffer to another apparatus as fast as possible.

For example, if the amount of the continuous data stored in the prebuffer exceeds a predetermined threshold value, the transmitting/receiving apparatus may set a higher priority level to a packet, thereby transmitting the packet preferentially.

As a result, a wide bandwidth is reserved, whereby it is possible to transmit data stored in the prebuffer to another apparatus as fast as possible.

Preferably, a postbuffer for storing data transmitted from another apparatus may be further included. Reading of the data stored in the postbuffer may be disabled if the amount of stored data is smaller or equal to a predetermined threshold value, and reading of the data stored in the postbuffer may be enabled when the amount of stored data exceeds the predetermined threshold value. The data stored in the postbuffer may be read, irrespective of the amount of stored data, during the execution of a training session which is performed by the training session execution section for changing a modulation rule used in the modulation transmission section.

As a result, even if the channel conditions vary, it is possible to output continuous data uninterruptedly from another apparatus in real time.

A second aspect of the present invention is directed to a method performed by a transmitting/receiving apparatus for packetizing input continuous data and transmitting the packetized data to another apparatus on a communication network. The transmitting/receiving apparatus performs the steps of: dividing the continuous data into a plurality of subpackets, and constructing a packet by concatenating the plurality of subpackets; modulating the constructed packet, and transmitting the modulated packet to another apparatus on the communication network; checking channel conditions, when a predetermined condition is satisfied, by communicating with another apparatus, and executing a training session to change a modulation rule so that a packet to be transmitted is transmitted successfully to a transmission destination apparatus; confirming whether or not a subpacket included in the transmitted packet is transmitted successfully to the transmission destination apparatus; reconstructing a new packet, if the modulation rule is changed by the execution of the training session, by concatenating a subpacket, which is confirmed as an unsuccessfully-transmitted subpacket, with subpackets newly generated from the continuous data; and modulating the reconstructed new packet in accordance with the changed modulation rule, and transmitting the modulated packet.

A third aspect of the present invention is directed to a program causing a computer device to packetize input continuous data, and transmit the packetized data to another apparatus on a communication network. The program causes the computer device to perform the steps of: dividing the continuous data into a plurality of subpackets, and constructing a packet by concatenating the plurality of subpackets; modulating the constructed packet, and transmitting the modulated packet to another apparatus on the communication network; checking channel conditions, when a predetermined condition is satisfied, by communicating with another apparatus, and executing a training session to change a modulation rule so that a packet to be transmitted is transmitted successfully to a transmission destination apparatus; confirming whether or not a subpacket included in the transmitted packet is transmitted successfully to the transmission destination apparatus; reconstructing a new packet, if the modulation rule is changed by the execution of the training session, by concatenating a subpacket, which is confirmed as an unsuccessfully-transmitted subpacket, with subpackets newly generated from the continuous data; and modulating the reconstructed new packet in accordance with the changed modulation rule, and transmitting the modulated packet.

A fourth aspect of the present invention is directed to a computer readable storing medium which stores a program causing a computer device to packetize input continuous data and transmit the packetized data to another apparatus on a communication network. The program causes the computer device to perform the steps of: dividing the continuous data into a plurality of subpackets, and constructing a packet by concatenating the plurality of subpackets; modulating the constructed packet, and transmitting the modulated packet to another apparatus on the communication network; checking channel conditions, when a predetermined condition is satisfied, by communicating with another apparatus, and executing a training session to change a modulation rule so that a packet to be transmitted is transmitted successfully to a transmission destination apparatus; confirming whether or not a subpacket included in the transmitted packet is transmitted successfully to the transmission destination apparatus; reconstructing a new packet, if the modulation rule is changed by the execution of the training session, by concatenating a subpacket, which is confirmed as an unsuccessfully-transmitted subpacket, with subpackets newly generated from the continuous data; and modulating the reconstructed new packet in accordance with the changed modulation rule, and transmitting the modulated packet.

A fifth aspect of the present invention is directed to an integrated circuit for packetizing input continuous data and transmitting the packetized data to another apparatus on a communication network, and receiving a packet transmitted from another apparatus. The integrated circuit comprises: a packet construction section for dividing the continuous data into a plurality of subpackets, and constructing a packet by concatenating the plurality of subpackets; a modulation transmission section for modulating the packet constructed by the packet construction section, and transmitting the modulated packet to another apparatus on the communication network; a training session execution section for checking channel conditions, when a predetermined condition is satisfied, by communicating with another apparatus, and changing a modulation rule used in the modulation transmission section so that a packet transmitted from the modulation transmission section is transmitted successfully to a transmission destination apparatus; and a subpacket transmission confirmation section for confirming whether or not a subpacket included in the transmitted packet is transmitted successfully to the transmission destination apparatus. If the modulation rule is changed by the training session execution section, the packet construction section reconstructs a new packet by concatenating a subpacket, which is confirmed as an unsuccessfully-transmitted subpacket by the subpacket transmission confirmation section, with subpackets newly generated from the continuous data, and the modulation transmission section modulates the reconstructed new packet in accordance with the changed modulation rule, and transmits the modulated packet.

As described above, based on the present invention, when channel conditions are degraded, it is possible to execute a training session without repeatedly performing retransmission under the poor channel conditions. Further, it is possible to successfully transmit data whose acknowledgement is not received by changing a modulation rule. As a result, it is possible to prevent data loss caused by a discarded packet while minimizing reduction in throughput. Especially, in the case of video data which is transmitted at a constant rate, it is possible to transmit data without data loss.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a structure of a communication network system according to a first embodiment of the present invention, and a structure of a transmitting/receiving apparatus used in the communication network system;

FIG. 4 is a block diagram showing structures of transmitting/receiving apparatuses 100a and 101a in the case where a Wavelet function is used;

FIG. 5 is a block diagram showing a structure of a communication network system according to a second embodiment of the present invention, and a structure of a transmitting/receiving apparatus used in the communication network system;

FIG. 7 is a block diagram showing structures of transmitting/receiving apparatuses 200a and 201a in the case where a Wavelet function is used;

FIG. 8 is a block diagram showing a structure of a communication network system according to a third embodiment of the present invention, and a structure of a transmitting/receiving apparatus used in the communication network system;

FIG. 9A is a schematic diagram for describing an operation of transmitting/receiving apparatuses 300 and 301 according to the third embodiment;

FIG. 9B is a schematic diagram for describing an operation of the transmitting/receiving apparatuses 300 and 301 according to the third embodiment;

FIG. 10 is a block diagram showing structures of transmitting/receiving apparatuses 300a and 301a in the case where a Wavelet function is used;

DESCRIPTION OF THE PREFERRED EMBODIMENTS

First Embodiment

Figure 2:
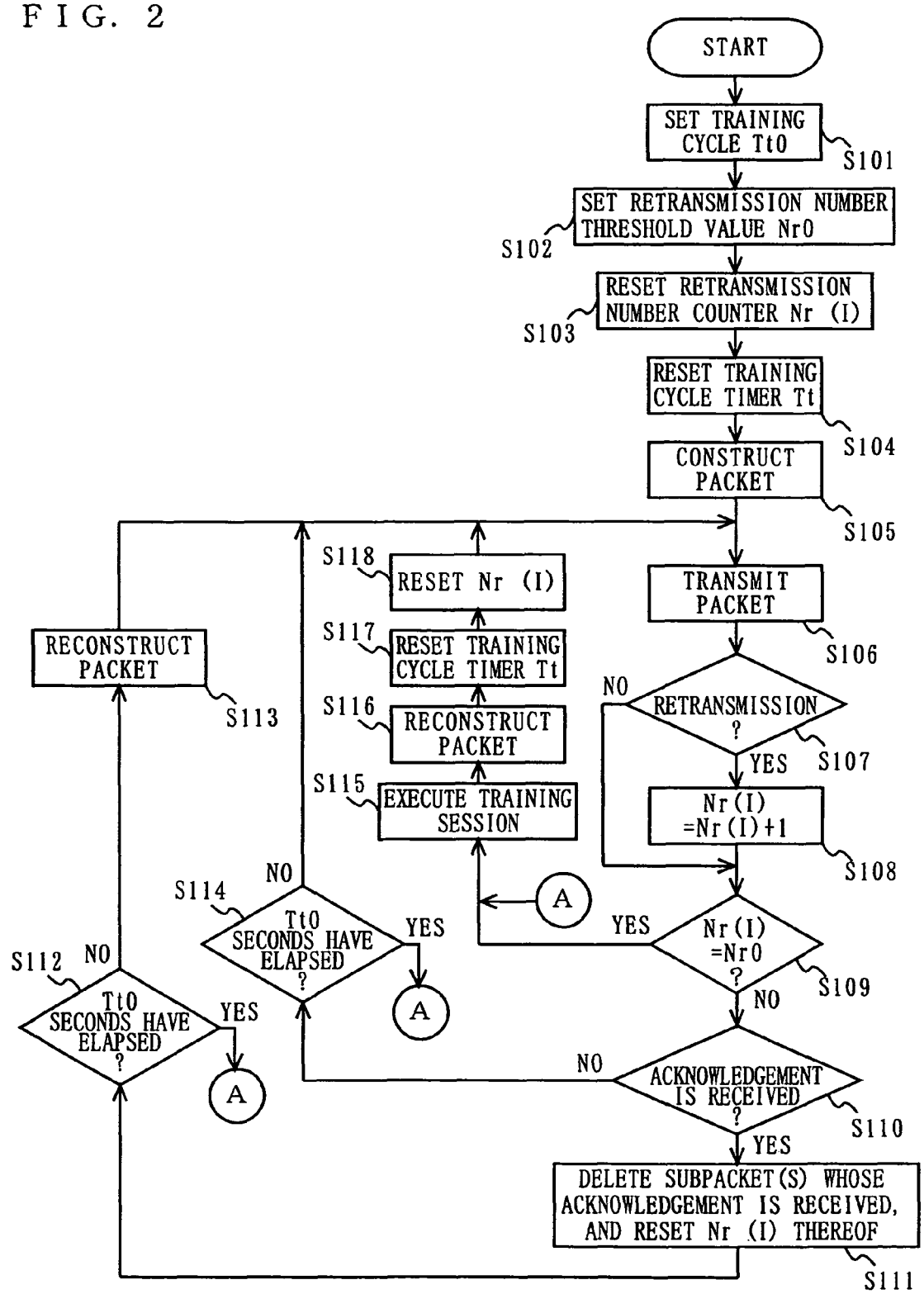
FIG. 2 is a flowchart showing an operation of a transmitting-end communication control section 1.

FIG. 1 is a block diagram showing a structure of a communication network system according to a first embodiment of the present invention, and a structure of a transmitting/receiving apparatus used in the communication network system. In FIG. 1, the communication network system includes transmitting/receiving apparatuses 100 and 101 connected to each other via a power line. In FIG. 1, it is assumed that the number of transmitting/receiving apparatuses is two, but there may be three or more transmitting/receiving apparatuses.

In FIG. 1, each of the transmitting/receiving apparatuses 100 and 101 includes a transmitting-end communication control section 1, QAM encoder sections 2, an IFFT section 3, an AFE (Analog Front End) 4, an FFT section 5, QAM decoder sections 6, a receiving-end communication control section 7, an SNR analytical results/acknowledgement notifying section 8, and a prebuffer 9 for packet reconstruction (hereinafter, referred to as a packet reconstruction buffer 9).

During a training session, the transmitting-end communication control section 1 determines how to allocate a bit string of input data to the QAM encoder section(s) 2 based on SNR analytical results notified by the SNR analytical results/acknowledgement notifying section 8. Note that input data is continuous data. The transmitting-end communication control section 1 allocates a bit string of input data to each QAM encoder section 2 in accordance with an allocation scheme determined based on the SNR analytical results. That is, the transmitting-end communication control section 1 performs serial-to-parallel conversion for input data in accordance with an allocation scheme determined based on the SNR analytical results. The transmitting-end communication control section 1 provides an instruction to the packet reconstruction prebuffer 9 to divide the input data stored therein into a plurality of subpackets, and construct one packet by concatenating the plurality of subpackets. Then, the transmitting-end communication control section 1 performs serial-to-parallel conversion for the constructed packet in accordance with a timing output from an external QoS controller (not shown), and outputs the converted packet. Hereinafter, in the absence of specific descriptions, a packet in the embodiments refers to a packet composed of a plurality of subpackets. When the transmitted subpacket is received successfully, the transmitting-end communication control section 1 deletes the successfully-received subpacket from the packet reconstruction prebuffer 9 in accordance with an acknowledgement notified by the SNR analytical results/acknowledgement notifying section 8. The transmitting-end communication control section 1 provides an instruction to the packet reconstruction prebuffer 9 to reconstruct a packet by concatenating an unsuccessfully-received subpacket(s) with subpackets generated from the input data.

In response to the instruction from the transmitting-end communication control section 1, the packet reconstruction prebuffer 9 divides input data into a plurality of subpackets, constructs one packet by concatenating the plurality of subpackets, and temporarily stores the constructed packet. Also, in response to the instruction from the transmitting-end communication control section 1, the packet reconstruction prebuffer 9 deletes a subpacket(s) whose acknowledgement is received. Further, in response to the instruction from the transmitting-end communication control section 1, the packet reconstruction prebuffer 9 reconstructs a packet by concatenating a subpacket(s) whose acknowledgement is not received with the subpackets generated from the input data, and temporarily stores the reconstructed packet.

Each QAM encoder section 2 modulates a bit string input from the transmitting-end communication control section 1 into an amplitude value and a phase value by using QAM.

The IFFT section 3 executes an inverse Fast Fourier transform based on the amplitude value and the phase value input from each QAM encoder section 2, and outputs its results. Thus, an OFDM signal modulated in accordance with the input data is output. The above-described OFDM signal is transmitted to the transmitting/receiving apparatus 101 via the AFE 4.

The FFT section 5 performs a Fast Fourier transform for the OFDM signal received from the transmitting/receiving apparatus 101 via the AFE 4, and outputs an amplitude value and a phase value of each carrier.

Each QAM decoder section 6 demodulates the amplitude value and the phase value, which are output from the FFT section 5, back into a bit string by using QAM, and outputs the bit string.

The receiving-end communication control section 7 converts the bit strings output from the QAM decoder sections 6 to a contiguous bit string, and outputs the contiguous bit string as output data. The receiving-end communication control section 7 determines whether or not each subpacket included in the packet is received successfully, uses a bitmap to represent the above determination results, and passes the bitmap to the SNR analytical results/acknowledgement notifying section 8 as an acknowledgement. In response to this, the transmitting-end communication control section 1 sends back the acknowledgement notified by the SNR analytical results/acknowledgement notifying section 8 to the transmitting/receiving apparatus from which the packet was transmitted. Also, the receiving-end communication control section 7 analyzes an SNR of each carrier based on the amplitude value and the phase value output from each QAM decoder section 6 during a training session, and passes the SNR analytical results to the SNR analytical results/acknowledgement notifying section 8. In response to this, the transmitting-end communication control section 1 sends back the SNR analytical results notified by the SNR analytical results/acknowledgement notifying section 8 to the transmitting/receiving apparatus from which the packet was transmitted.

The SNR analytical results/acknowledgement notifying section 8 passes the SNR analytical results and the acknowledgement from the receiving-end communication control section 7 to the transmitting-end communication control section 1. The SNR analytical results include SNR analytical results generated therein and SNR analytical results transmitted from another apparatus. The acknowledgement includes an acknowledgement generated therein and an acknowledgement transmitted from another apparatus. The transmitting-end communication control section 1 changes the bit allocation scheme applied to the QAM encoder based on the SNR analytical results transmitted from another apparatus. The transmitting-end communication control section 1 sends the SNR analytical results generated therein to another transmitting/receiving apparatus. Also, based on the acknowledgement transmitted from another apparatus, the transmitting-end communication control section 1 causes the packet reconstruction prebuffer 9 to delete a successfully-transmitted subpacket, and reconstruct a packet by concatenating an unsuccessfully-transmitted subpacket(s) with subpackets generated from new input data. The transmitting-end communication control section 1 sends an acknowledgement generated therein to another transmitting/receiving apparatus.

The present invention differs from a conventional power line communication in that the packet reconstruction prebuffer 9 is included in the structure. The packet reconstruction prebuffer 9 constructs one packet by concatenating a plurality of subpackets. The packet reconstruction prebuffer 9 has the following functions: selecting a subpacket(s) whose acknowledgement is not received, constructing a packet by concatenating the selected subpacket (s) with subpackets generated from new input data, and transmitting the constructed packet. The packet reconstruction prebuffer 9 is able to store data that can be transmitted in at least one packet. If the buffer is in a full state, the packet reconstruction prebuffer 9 returns a busy state to an inputting side (application, etc.), and inhibits further writing of data. In response to a reading request from the transmitting-end communication control section 1, the packet reconstruction prebuffer 9 outputs data. The packet reconstruction prebuffer 9 does not delete the temporarily stored data, and does not enable the overwriting of an area in which the data is written unless the transmitting-end communication control section 1 issues an update instruction. When an acknowledgement is received, the packet reconstruction prebuffer 9 deletes the subpacket(s) whose acknowledgment is received. One packet is comprised of one or more subpackets. It is possible to perform error detection and acknowledgement for each subpacket. Assume that input data is IP data, and an Ethernet (R) frame is input as I/F. In this case, the packet reconstruction prebuffer 9 uses an Ethernet (R) frame as one subpacket unit, and constructs a subpacket by attaching address information, which is required for power line communication, and an error detection flag and a subpacket number, etc., which are required for retransmission control, to the Ethernet frame (R) as a header or a footer. The acknowledgement is performed such that a transmission destination terminal, which has received a packet composed of a plurality of subpackets, detects the presence or absence of an error in each subpacket, and sends back subpacket numbers corresponding to all error-free subpackets to a terminal from which the packet was transmitted. In the case where an acknowledgement of at least one subpacket is received, the packet reconstruction prebuffer 9 updates only the subpacket whose acknowledgment is received. The subpacket(s) whose acknowledgment is received is not retransmitted. On the other hand, the subpacket(s) whose acknowledgement is not received is retransmitted when a next packet is transmitted. That is, a new packet is reconstructed by concatenating the packet (s) whose acknowledgement is not received with subpackets generated from new input data, and the reconstructed packet is transmitted. In the case where no acknowledgments of any subpackets are received, packet reconstruction is not performed.

In the case where a modulation rule (how many bits are allocated to which QAM encoder section 2, that is, how many bits are allocated to which carrier) changes as a result of the execution of a training session, a time period assigned to the transmitting/receiving apparatus for transmitting one packet is reduced or increased. Thus, if there is a change in the modulation rule, the packet reconstruction prebuffer 9 adjusts the number of subpackets included in one packet. In the case where a plurality of transmission terminals alternately perform transmission at a predetermined timing interval by using TDMA (Time Division Multiple Access), etc., transmission signals transmitted from the plurality of transmission terminals may collide unless packet transmission is completed within a predetermined time period. Thus, it is necessary to determine a time period required for transmitting one packet by the training session. If the modulation rule changes as a result of the training session so as to increase the transmission speed, it is possible to transmit a greater number of subpackets, which are concatenated with subpackets generated from new input data, in one transmission, thereby increasing efficiency. Thus, in the case where the transmission speed is increased, the packet reconstruction prebuffer 9 reconstructs a packet by concatenating a greater number of subpackets with subpackets generated from new data stored therein so as to correspond to the increased transmission speed.

FIG. 2 is a flowchart showing an operation of the transmitting-end communication control section 1. Hereinafter, the operation of the transmitting-end communication control section 1 will be described with reference to FIG. 2.

First, the transmitting-end communication control section 1 sets a training cycle Tt0 (step S101). Note that, in the case where the channel conditions are recovered, the transmission speed is increased by executing a training session, whereby it is possible to perform high-efficiency transmission by transmitting a packet reconstructed by concatenating subpacket(s) with subpackets generated from new data. However, short frequent training sessions should be avoided since the training session prevents high-efficiency transmission due to its overhead. Thus, it is effective to perform packet reconstruction while avoiding overhead caused by a training session by using error correcting results, etc., in combination with, for example, a method for checking if the channel conditions are recovered. The training cycle Tt0 should be determined in consideration of the above-described points.

Next, the transmitting-end communication control section 1 sets a threshold value Nr0 of the retransmission number (step S102). The retransmission number threshold value Nr0 may preferably be smaller than a value used in a conventional technique since the present invention is designed to minimize the number of retransmission caused by the poor channel conditions. Based on the present invention, a training session is performed when the channel conditions are degraded, thereby changing the modulation rule in accordance with the current channel conditions. As a result, data of a subpacket(s) whose acknowledgment is not received is reconstructed and transmitted after the training session.

Next, the transmitting-end communication control section 1 resets a retransmission number counter Nr (I) to zero (step S103). Here, a numeral I represents a serial number of a subpacket. Next, the transmitting-end communication control section 1 resets a training cycle timer Tt to zero (step S104). Next, the transmitting-end communication control section 1 causes the packet reconstruction prebuffer 9 to divide input data into subpackets, and construct a packet (step S105).

Next, the transmitting-end communication control section 1 transmits the constructed packet to a transmission destination apparatus (step S106). Next, the transmitting-end communication control section 1 determines whether or not a packet transmission performed at step S106 is retransmission (step S107). If it is not retransmission, the transmitting-end communication control section 1 proceeds to step S109. On the other hand, if it is retransmission, the transmitting-end communication control section 1 increments the retransmission number counter Nr (I) by 1 (step S108). The increment of the retransmission number counter Nr (I) is performed for each subpacket.

Next, the transmitting-end communication control section 1 determines whether or not the maximum value of the retransmission number counter Nr (I) is equal to Nr0 (step S109). If the maximum value is equal to Nr0, the transmitting-end communication control section 1 decides that the retransmission number has reached the upper limit, executes a training session, and changes the modulation rule (step S115). Next, in order to maximize the number of subpackets to be transmitted at a changed transmission speed, the transmitting-end communication control section 1 causes the packet reconstruction prebuffer 9 to concatenate a subpacket(s) whose acknowledgement is not received with subpackets generated from new input data, thereby reconstructing a new packet (step S116). Next, the transmitting-end communication control section 1 resets the training cycle timer Tt to zero (step S117), resets all retransmission number counters Nr (I) to zero (step S118), and goes back to step S106.

If the maximum number is not equal to Nr0 at step S109, the transmitting-end communication control section 1 determines whether or not an acknowledgement is received (step S110). If the acknowledgement is not received, the transmitting-end communication control section 1 checks the training cycle timer Tt to find out if Tt0 seconds have elapsed. If Tt0 seconds have not elapsed, the transmitting-end communication control section 1 goes back to step S106, and retransmits a packet stored in the packet reconstruction prebuffer 9. On the other hand, if Tt0 seconds have elapsed at step S114, the transmitting-end communication control section 1 proceeds to step S115, and executes a training session.

If the acknowledgement of at least one subpacket is received at step S110, the transmitting-end communication control section 1 deletes the subpacket(s) whose acknowledgement is received from the packet reconstruction prebuffer 9, and resets the retransmission number counter Nr (I) of the above-described subpacket(s) (step S111). Note that if acknowledgements of all subpackets are not received at step S110, the subpackets stored in the packet reconstruction prebuffer 9 are not deleted. Thus, a new packet is not reconstructed at the following step S113, and the same packet is retransmitted at step S106.

After step S111, the transmitting-end communication control section 1 checks the training cycle timer Tt to find out if Tt0 seconds have elapsed. If Tt0 seconds have not elapsed, the transmitting-end communication control section 1 generates subpackets from new input data, provides an instruction to the packet reconstruction prebuffer 9 to reconstruct a new packet by concatenating the subpacket(s), which is not deleted at step S111, with the generated subpackets (step S113), and proceeds to step S106. On the other hand, if Tt0 seconds have elapsed, the transmitting-end communication control section 1 proceeds to step S115, and executes a training session.

Here, the packet reconstruction prebuffer, in which a data string is sequentially stored based on a unit of subpacket data, is a buffer memory capable of differentiating between a data string corresponding to a subpacket whose acknowledgement is received and a subpacket whose acknowledgement is not received. The packet reconstruction prebuffer is also capable of assigning priorities to a data string, which corresponds to a subpacket whose acknowledgement is not received, and subsequently input data. In order to construct a packet, the packet reconstruction prebuffer is capable of constructing a subpacket by reading a data string corresponding to a subpacket whose acknowledgement is not received from oldest to newest, and reading subsequently input data from oldest to newest. The packet reconstruction prebuffer can be realized as follows: data is stored in a certain contiguous area of a memory based on a unit of a subpacket data, a combination of a starting address of the area and a data length is stored in a first queue, a combination in data area corresponding to a subpacket included in a transmitted packet is deleted from the first queue, a combination in a data area corresponding to a subpacket whose acknowledgement is not received is sequentially stored in a second queue, and a packet to be transmitted next is constructed by sequentially constructing a subpacket from the data area stored in the second queue, which is followed by a sequential subpacket construction from a data area stored in the first queue.

Hereinafter, with reference to FIG. 2, a flow of the operation of the transmitting/receiving apparatuses 100 and 101 (hereinafter, the transmitting/receiving apparatus 100 will be taken as an example) will be described in detail.

First, an operation of the transmitting/receiving apparatus 100 in the case where communication is smoothly performed under favorable channel conditions will be described. In this case, the transmitting/receiving apparatus 100 constructs a packet in accordance with the current channel conditions (step S105), and transmits the constructed packet (step S106). The transmitting/receiving apparatus 100 repeatedly transmits the constructed packet at step S106 until an acknowledgement is received (a flow from step S110 to step S114). When the acknowledgement is received, the transmitting/receiving apparatus 100 detects a subpacket(s) whose acknowledgement is not received based on the received acknowledgement. As described above, it is assumed that communication is smoothly performed under favorable communication conditions. Thus, in this case, there is no subpacket whose acknowledgement is not received. As a result, the transmitting/receiving apparatus 100 deletes all subpackets stored in the packet reconstruction prebuffer 9, resets the retransmission number counter Nr (I) corresponding to the deleted subpackets (step S111), reconstructs a packet based on new input data (step S113), and transmits the reconstructed packet (step S106). Note that, if a training cycle has elapsed (step S112, step S114) during the above-described process, the transmitting/receiving apparatus 100 executes a training session (step S115).

Next, an operation of the transmitting/receiving apparatus 100 in the case where channel conditions are temporarily degraded will be described. In this case, the transmitting/receiving apparatus 100 constructs a packet in accordance with the current channel conditions (step S105), and transmits the constructed packet (step S106). The transmitting/receiving apparatus 100 repeatedly transmits the constructed packet (step S106) until an acknowledgement is received (a flow from step S110 to step S114). Assume that the channel conditions are temporarily degraded in the course of the above-described process. When the acknowledgement is received, the transmitting/receiving apparatus 100 detects a subpacket(s) whose acknowledgment is not received based on the received acknowledgement. In this case, acknowledgements of at least one subpacket is not received due to the temporary poor channel conditions. Thus, the transmitting/receiving apparatus 100 deletes a subpacket(s), whose acknowledgement is received, stored in the packet reconstruction prebuffer 9, and resets the retransmission number counter Nr (I) corresponding to the deleted subpacket(s) (step S111). The transmitting/receiving apparatus 100 constructs a new packet by concatenating the subpacket(s) whose acknowledgement is not received with subpackets generated from new input data (step S113), and transmits the constructed packet (step S106). The retransmitted packet is successfully transmitted to the transmission destination apparatus since the poor channel conditions are temporary. Note that, if a training cycle has elapsed (step S112, step S114) during the above-described process, the transmitting/receiving apparatus 100 executes a training session (step S115).

Next, an operation of the transmitting/receiving apparatus 100 in the case where channel conditions are degraded for long periods will be described. In this case, the transmitting/receiving apparatus 100 constructs a packet in accordance with the current channel conditions (step S105), and transmits the constructed packet (step S106). The transmitting/receiving apparatus 100 repeatedly transmits the constructed packet (step S106) until an acknowledgement is received (a flow from step S110 to step S114). In the course of the above-described process, an acknowledgement is received. The transmitting/receiving apparatus 100 may receive an acknowledgement indicating a subpacket which is not transmitted successfully due to the continued poor channel conditions. Thus, even if a reconstructed packet is repeatedly retransmitted (steps S111 to S113, and step S106), the transmitting/receiving apparatus 100 may not obtain, at step S110, an acknowledgment indicating that a subpacket(s) has been successfully transmitted. As a result, the retransmission number counter Nr (I) reaches the set value Nr0 (a flow from step S105 to step S115). In this case, the transmitting/receiving apparatus 100 executes a training session (step S115), checks the channel conditions based on the SNR analytical results, and changes the bit allocation scheme applied to each QAM encoder section 2, thereby changing the modulation rule so that a packet is successfully transmitted. As a result, the transmission speed is reduced, whereby the number of packets included in one packet is reduced. Then, the transmitting/receiving apparatus 100 reconstructs a packet by concatenating the unsuccessfully-transmitted subpackets with subpackets generated from input data, and transmits the reconstructed packet after steps S117 and S118 (step S106). Note that, if a training cycle has elapsed (step S112, step S114) during the above-described operation, the transmitting/receiving apparatus 100 executes a training session (step S115).

As such, according to the first embodiment, in the case where the poor channel conditions continue for long periods, when the number of retransmission reaches a predetermined retransmission number, the transmitting/receiving apparatus executes a training session without deleting a subpacket(s) whose acknowledgement is not received before a training cycle has elapsed. Then, the transmitting/receiving apparatus changes a modulation rule so that a packet is transmitted as fast as possible under the current channel conditions, and reconstructs a packet in accordance with the changed transmission speed by concatenating the subpacket(s) whose acknowledgement is not received with subpackets generated from new input data. As a result, the subpacket(s) is retransmitted without being discarded, whereby it is possible to prevent data loss. Also, a packet to be transmitted as fast as possible under the current conditions is reconstructed and transmitted, whereby it is possible to prevent reduction in throughput.

Variant of the First Embodiment

Figure 3:
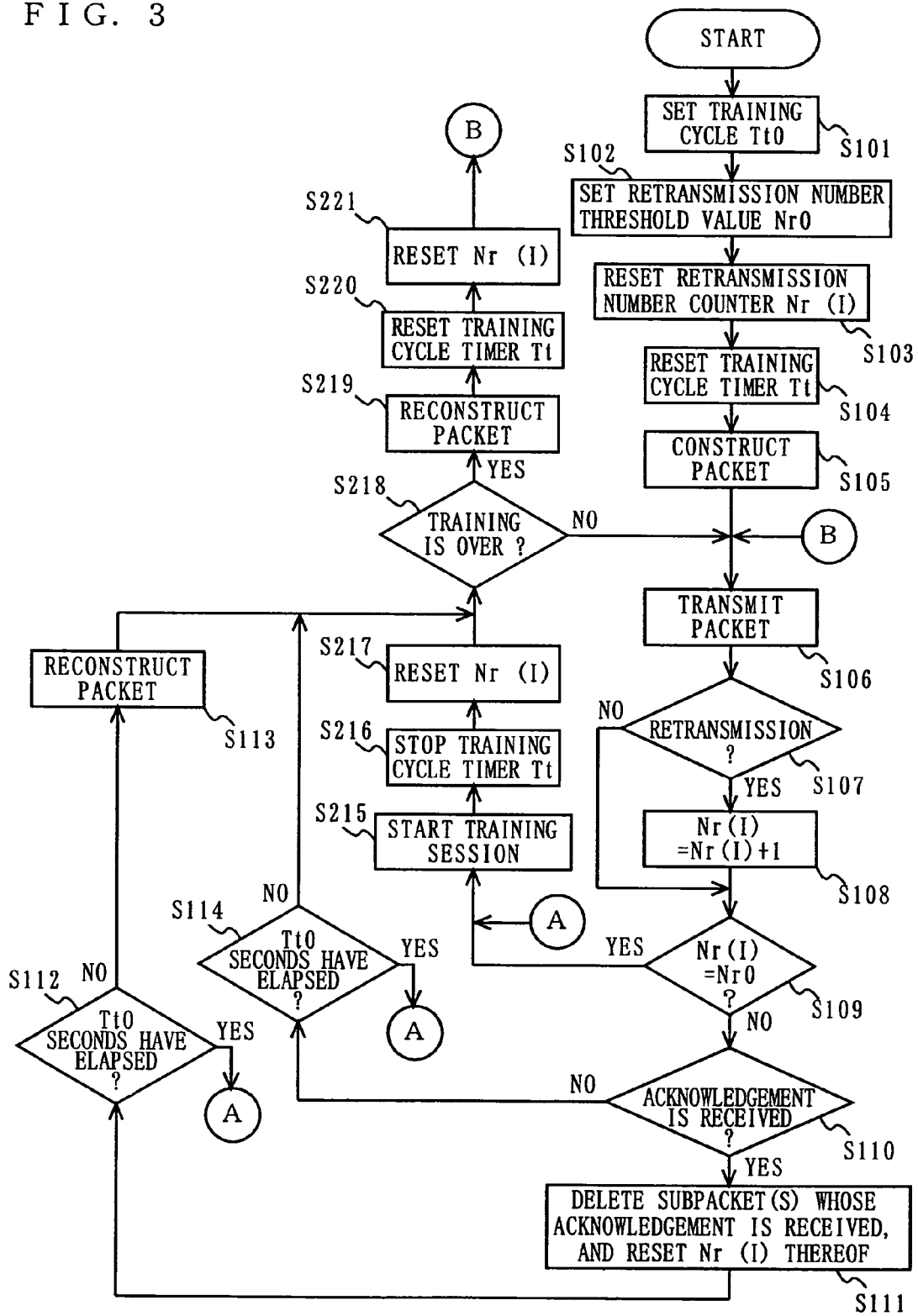
FIG. 3 is a flowchart showing an operation of the transmitting-end communication control section 1 in the case where a packet is retransmitted even when a training session is being executed.

In the above-described first embodiment, it is assumed that a training session is performed at step S115 shown in FIG. 2, thereby performing packet reconstruction. However, in the case where the execution of a training session requires substantial time, a packet may be retransmitted even when a training session is being executed. FIG. 3 is a flowchart showing an operation of the transmitting-end communication control section 1 in the case where a packet is retransmitted even when a training session is being executed. In FIG. 3, any steps which operate in similar manners to their counterparts in the first embodiment are denoted by like step numbers. Hereinafter, with reference to FIG. 3, the differences over the first embodiment will be described below.

If the retransmission number counter Nr (I) is equal to the retransmission number threshold value Nr0 (step S109), the transmitting-end communication control section 1 starts a training session (step S215). Next, the transmitting-end communication control section 1 stops the training cycle timer Tt (step S216) Next, the transmitting-end communication control section 1 resets all retransmission number counters Nr (I) to zero (step S217), and proceeds to step S218.

The transmitting-end communication control section 1 also proceeds to step S218 after step S114 and step S113.

At step S218, the transmitting-end communication control section 1 determines whether or not the training session is over. Specifically, the transmitting-end communication control section 1 receives SNR analytical results from a transmission destination apparatus. If the transmitting-end communication control section 1 changes the modulation rule based on the received SNR analytical results, it is determined that the training session is over. If the training session is not over, the transmitting-end communication control section 1 continues to transmit a packet (step S106). On the other hand, if the training session is over, in order to maximize the number of subpackets to be transmitted at a changed transmission speed, the transmitting-end communication control section 1 causes the packet reconstruction prebuffer 9 to reconstruct a packet by concatenating a subpacket(s) whose acknowledgement is not received with subpackets generated from new input data (step S219). Next, the transmitting-end communication control section 1 resets the training cycle timer Tt to zero (step S220), resets all retransmission number counters Nr (I) to zero (step S221), and transmits a packet (step S106).

As such, a packet may be retransmitted even when a training session is being performed.

One embodiment of a packet reconstruction method has been described above, but it is not limited thereto. The transmitting-end communication control section may use a retransmission buffer to reconstruct a packet by using data stored in the retransmission buffer.

Note that, in the first embodiment, it is assumed that QAM is used as a modulation scheme, but it is not limited thereto. For example, BPSK, QPSK, PAM, or ASK modulation may be used as a modulation scheme. Also, in the first embodiment, it is assumed that an FFT section and an IFFT section are used. However, the effect of the present invention can also be obtained by using a DWT (Discrete Wavelet Transform) section and an IDWT (Inverse Discrete Wavelet Transform) section, in which a Wavelet function is used as a basis function in place of a trigonometric function. FIG. 4 is a block diagram showing structures of transmitting/receiving apparatuses 100a and 101a in the case where a Wavelet function is used. As shown in FIG. 4, the transmitting/receiving apparatus using a Wavelet function differs from the transmitting/receiving apparatus shown in FIG. 1 in that PAM encoder sections 2a and PAM decoder sections 6a are included in place of the QAM encoder sections 2 and the QAM decoder sections 6, and an IDWT section 3a and a DWT section 5a are included in place of the IFFT section 3 and the FFT section 5.

Note that, in the first embodiment, it is assumed that a subpacket is an Ethernet (R) frame. However, a subpacket may be an error-correcting coding block (an error-correcting block such as a Reed-Solomon coding block, a convolution coding block, and a Turbo coding block). The present invention can also be applied to a case where subpackets are reconstructed and retransmitted on an error-correcting coding block basis.

Second Embodiment

FIG. 5 is a block diagram showing a structure of a communication network system according to a second embodiment of the present invention, and a structure of a transmitting/receiving apparatus used in the communication network system. In FIG. 5, the communication network system includes transmitting/receiving apparatuses 200 and 201 connected to each other via a power line. In FIG. 5, it is assumed that the number of transmitting/receiving apparatuses is two, but there may be three or more transmitting/receiving apparatuses. In FIG. 5, any component elements which function in similar manners to their counterparts in the first embodiment are denoted by like numerals, and the description thereof is omitted.

In FIG. 5, each of the transmitting/receiving apparatuses 200 and 201 includes a transmitting-end communication control section 1, QAM encoder sections 2, an IFFT section 3, an AFE 4, an FFT section 5, QAM decoder sections 6, a receiving-end communication control section 7, an SNR analytical results/acknowledgement notifying section 8, a packet reconstruction prebuffer 9, and a postbuffer 10.

The transmitting/receiving apparatuses 200 and 201 differ from their counterparts in the first embodiment in that the postbuffer 10 is additionally included. Data processed in the second embodiment is real-time video data and audio data such as MPEG2-TS. Thus, despite a small amount of jitter, an average data speed of input data and output data is constant.

Figure 6A:
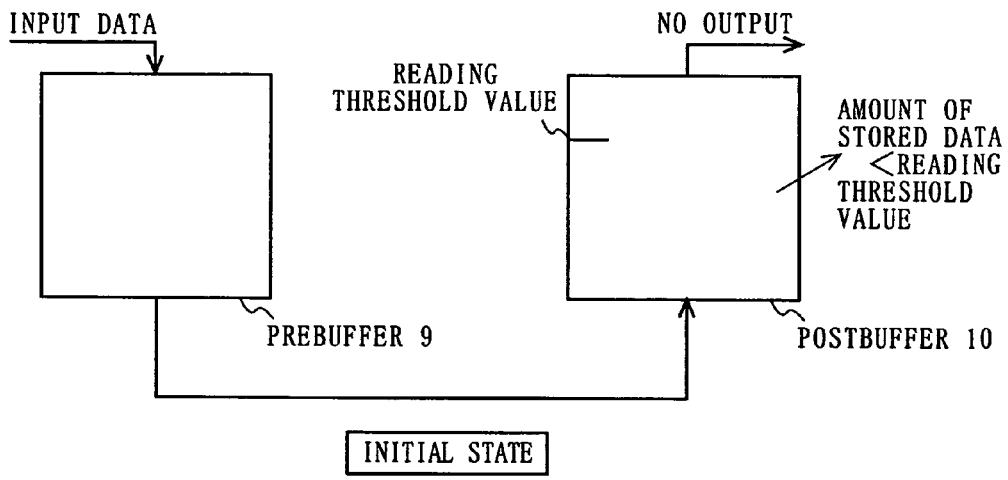
FIG. 6A is a schematic diagram for describing an operation of transmitting/receiving apparatuses 200 and 201 according to the second embodiment of the present invention.
Figure 6B:
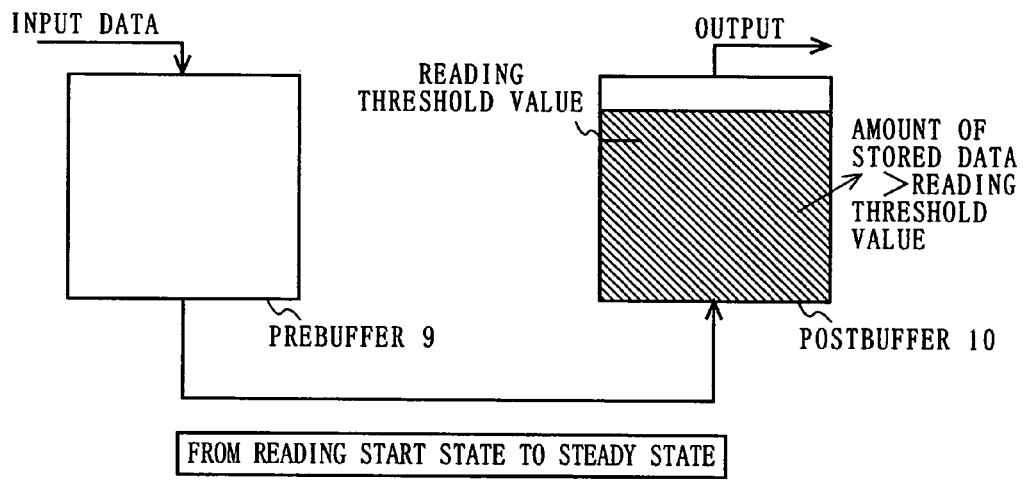
FIG. 6B is a schematic diagram for describing an operation of the transmitting/receiving apparatuses 200 and 201 according to the second embodiment of the present invention.
Figure 6C:
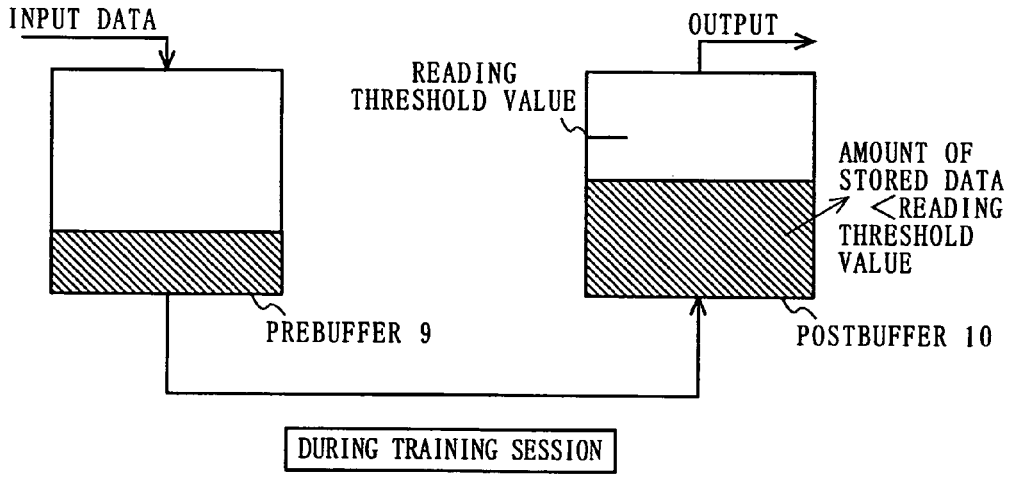
FIG. 6C is a schematic diagram for describing an operation of the transmitting/receiving apparatuses 200 and 201 according to the second embodiment of the present invention.

FIGS. 6A to 6C are schematic diagrams for describing an operation of the transmitting/receiving apparatuses 200 and 201 according to the second embodiment of the present invention. Hereinafter, using FIGS. 6A to 6C, the operation of the transmitting/receiving apparatuses 200 and 201 according to the second embodiment will be described. A transmission source transmitting/receiving apparatus (for example, the transmitting/receiving apparatus 200), which operates in similar manners to its counterpart in the first embodiment, constructs a packet based on input data, and transmits the constructed packet to a transmission destination apparatus (for example, the transmitting/receiving apparatus 201). That is, data input to the packet reconstruction prebuffer 9 is packetized, and sent over the power line. Data is not stored under circumstances where communication is performed with no packet error, and an acknowledgement is returned.

On the other hand, the transmission destination transmitting/receiving apparatus 201 monitors the amount of data stored in the postbuffer 10. A reading threshold value is set in the postbuffer 10. The transmitting/receiving apparatus 201 determines whether or not the amount of data stored in the postbuffer 10 exceeds the reading threshold value. In the case where the amount of data stored in the postbuffer 10 does not exceed the reading threshold value, the transmitting/receiving apparatus 201 does not output data stored in the postbuffer 10 (see FIG. 6A). That is, the transmitting/receiving apparatus 201 disables reading of data in the postbuffer 10 unless the amount of data stored in the postbuffer 10 exceeds the reading threshold value.

In the case where the amount of data stored in the postbuffer 10 exceeds the reading threshold value, the transmitting/receiving apparatus 201 starts outputting of data stored in the postbuffer 10 (see FIG. 6B). That is, when the amount of data stored in the postbuffer 10 exceeds the reading threshold value, the transmitting/receiving apparatus 201 enables reading of data in the postbuffer 10. In this case, a reading speed is a constant video rate, and data is being input to the transmission source transmitting/receiving apparatus 200 at the same rate. Thus, the input data is transmitted to the transmission destination transmitting/receiving apparatus 201 via the power line. As a result, an average amount of data stored in the postbuffer 10 is kept at a constant level (see FIG. 6B).

Assume that there is a change in the channel conditions, and the execution of a training session is started. During the training session, transmission from the transmission source apparatus to the transmission destination apparatus is interrupted. Thus, the packet reconstruction prebuffer 9 of the transmitting/receiving apparatus 200 stores data, which is input at a constant rate (see FIG. 6C), whereas the transmitting/receiving apparatus 201 continues to read the data stored in the postbuffer 10 at a constant rate even when the training session is being executed.

As such, based on the second embodiment, data stored in the postbuffer is output even when a training session is being executed due to changed channel conditions. Thus, the transmitting/receiving apparatus is able to uninterruptedly output continuous data in real time.

Note that, unlike the packet reconstruction prebuffer 9 in the first embodiment, the packet reconstruction prebuffer 9 in the second embodiment has to store data which is input thereto during an interruption of transmission. Thus, the packet reconstruction prebuffer 9 in the second embodiment requires a greater capacity than the packet reconstruction prebuffer 9 in the first embodiment.

Note that, in the second embodiment, it is assumed that QAM is used as a modulation scheme, but it is not limited thereto. For example, BPSK, QPSK, PAM, or ASK modulation may be used as a modulation scheme. Also, in the second embodiment, it is assumed that an FFT section and an IFFT section are used. However, the effect of the present invention can also be obtained by using a DWT (Discrete Wavelet Transform) section and an IDWT (Inverse Discrete Wavelet Transform) section, in which a Wavelet function is used as a basis function in place of a trigonometric function. FIG. 7 is a block diagram showing structures of transmitting/receiving apparatuses 200a and 201a in the case where a Wavelet function is used. As shown in FIG. 7, the transmitting/receiving apparatus using a Wavelet function differs from the transmitting/receiving apparatus shown in FIG. 5 in that PAM encoder sections 2a and PAM decoder sections 6a are included in place of the QAM encoder sections 2 and the QAM decoder sections 6, and an IDWT section 3a and a DWT section 5a are included in place of the IFFT section 3 and the FFT section 5.

Third Embodiment

FIG. 8 is a block diagram showing a structure of a communication network system according to a third embodiment of the present embodiment, and a structure of a transmitting/receiving apparatus used in the communication network system. In FIG. 8, the communication network system includes transmitting/receiving apparatuses 300 and 301 connected to each other via a power line. In FIG. 8, it is assumed that the number of transmitting/receiving apparatuses is two, but there may be three or more transmitting/receiving apparatuses. In FIG. 8, any component elements which function in similar manners to their counterparts in the first embodiment are denoted by like numerals, and the description thereof is omitted.

In FIG. 8, each of the transmitting/receiving apparatuses 300 and 301 includes a transmitting-end communication control section 1b, QAM encoder sections 2, an IFFT section 3, an AFE 4, an FFT section 5, QAM decoder sections 6, a receiving-end communication control section 7b, an SNR analytical results/acknowledgement notifying section 8, a packet reconstruction prebuffer 9, and a postbuffer 10.

In the transmitting/receiving apparatuses 300 and 301 shown in FIG. 8, an operation of the transmitting-end communication control section 1b differs from the operation of its counterpart in the second embodiment. The transmitting-end communication control section 1b uses a MAC (Media Access Control) layer protocol capable of providing a guaranteed bandwidth. The MAC layer protocol is used in a time-sharing system for allowing a plurality of terminal devices to use a common medium (e.g., a single wireless channel or a single power line), and the protocol guarantees that communication between specific terminals is performed at a constant communication speed. Specifically, a bandwidth management device (not shown) such as a QoS controller is used, and each transmitting/receiving apparatus reserves a bandwidth by making a request to the bandwidth management device. The bandwidth management device provides a right to transmit, which corresponds to a reserved speed per unit time, for the transmitting/receiving apparatus which has reserved a bandwidth. When the right to transmit is obtained, each transmitting/receiving apparatus sends data for only a time period corresponding to the reserved speed. Thus, time-shared utilization of a common medium is realized among a plurality of transmitting/receiving apparatuses.

FIGS. 9A and 9B are schematic diagrams for describing an operation of transmitting/receiving apparatuses 300 and 301 according to the third embodiment. Hereinafter, using FIGS. 9A and 9B, the operation of the transmitting/receiving apparatuses 300 and 301 according to the third embodiment will be described.

FIG. 9A is an illustration showing data stored in the packet reconstruction prebuffer 9 and the postbuffer 10 when a modulation parameter is readapted to channel conditions after the execution of a training session. That is, FIG. 9A shows a state which is continued from FIG. 6C. In FIG. 9A, almost all data stored in the postbuffer 10 of the transmission destination apparatus is read therefrom during a training session, and the packet reconstruction prebuffer 9 of the transmission source apparatus stores input data during the training session. A high-speed reading threshold value is set in the packet reconstruction prebuffer 9.

The transmitting-end communication control section 1b compares the amount of data stored in the packet reconstruction prebuffer 9 and the high-speed reading threshold value. In an example shown in FIG. 9A, the amount of stored data exceeds the high-speed reading threshold value. In this case, the transmitting-end communication control section 1b requests the bandwidth management device to set a bandwidth faster than an input speed of video data, which is an example of continuous data. That is, in the case where the amount of data stored in the packet reconstruction prebuffer 9 exceeds a predetermined high-speed reading threshold value, the transmitting-end communication control section 1b requests the bandwidth management device, which manages a bandwidth assigned to a channel, to widen the assigned bandwidth. As a result, data stored in the packet reconstruction prebuffer 9 is transmitted to the postbuffer 10 of the transmission destination apparatus as fast as possible. Here, the reserved bandwidth is equal to an upper limit of an available bandwidth, which is restricted by traffic of other transmitting/receiving apparatuses. By reserving such a bandwidth, it is possible to transfer data as fast as possible.

After all data stored in the packet reconstruction prebuffer 9 is transferred to the postbuffer 10, the packet reconstruction prebuffer 9 becomes empty as shown in FIG. 9B. When the packet reconstruction prebuffer 9 becomes empty, the transmitting-end communication control section 1b reserves a bandwidth (i.e., a bandwidth as fast as the video data rate) assigned in an initial state in which reading of video data is started, by making a request to the bandwidth management device.

As such, based on the third embodiment, in order to transfer continuous data, which is stored in a prebuffer during the poor channel conditions, to a postbuffer as fast as possible, the transmission source transmitting/receiving apparatus reserves a wider bandwidth by making a request to the bandwidth management device. If such a reservation is accepted, the transmission source transmitting/receiving apparatus is able to transfer the continuous data stored in the prebuffer to the postbuffer of a transmission destination transmitting/receiving apparatus. As a result, even if data stored in the postbuffer has to be read during next poor channel conditions, it is possible to reproduce data with no data loss. Also, it is possible to free up space in the prebuffer.

Note that, in the third embodiment, it is assumed that the transmitting-end communication control section 1b uses a MAC layer protocol capable of providing a guaranteed bandwidth. However, the effect of the present invention can also be obtained by using a MAC layer protocol capable of controlling priorities using CSMA (Carrier Sense Multiple Access). Specifically, as shown in FIG. 9A, when the amount of data stored in the prebuffer exceeds a high-speed reading threshold value, the transmitting-end communication control section 1b sets a higher priority level to the packet to be transmitted. As a result, the transmission source transmitting/receiving apparatus is able to transmit data stored in the prebuffer preferentially over other transmitting/receiving apparatuses, whereby it is possible to transmit data stored in the prebuffer at high speed.

High-speed data transmission is performed when data is stored in the prebuffer. In the case where data is not stored in the prebuffer, the transmitting/receiving apparatus does not perform high-speed data transmission since there is no data to be transmitted, even if a wider bandwidth is reserved or a higher priority level is set. That is, the transmitting/receiving apparatus is able to transmit data at high speed when data is stored in the prebuffer by previously reserving a wider bandwidth or setting a higher priority level than the video data rate, not by changing a reserved bandwidth and a priority level in accordance with the amount of data stored in the prebuffer.

Note that, in the third embodiment, it is assumed that QAM is used as a modulation scheme, but it is not limited thereto. For example, BPSK, QPSK, PAM, or ASK modulation may be used as a modulation scheme. Also, in the third embodiment, it is assumed that an FFT section and an IFFT section are used. However, the effect of the present invention can also be obtained by using a DWT (Discrete Wavelet Transform) section and an IDWT (Inverse Discrete Wavelet Transform) section, in which a Wavelet function is used as a basis function in place of a trigonometric function. FIG. 10 is a block diagram showing structures of transmitting/receiving apparatuses 300a and 301a in the case where a Wavelet function is used. As shown in FIG. 10, the transmitting/receiving apparatus using a Wavelet function differs from the transmitting/receiving apparatus shown in FIG. 8 in that PAM encoder sections 2a and PAM decoder sections 6a are included in place of the QAM encoder sections 2 and the QAM decoder sections 6, and an IDWT section 3a and a DWT section 5a are included in place of the IFFT section 3 and the FFT section 5.

Note that the above-described embodiments can be realized by causing a CPU to execute a program, which is able to cause a CPU to execute the above-described procedure stored in a recording medium (a ROM, a RAM, or a hard disk, etc.). In this case, the program may be executed after it is stored in a storing device via a recording medium, or may be directly executed from the recording medium. Here, the recording medium includes a ROM, a RAM, a semiconductor memory such as a flash memory, a magnetic disk memory such as a flexible disk and a hard disk, an optical disk such as a CD-ROM, a DVD, and a BD, a memory card, or the like.

Note that each functional block as shown in FIGS. 1, 4, 5, 7, 8, and 10 may be realized as an LSI, which is an integrated circuit. Each functional block may be separately constructed in chip form, or may be constructed in chip form so that a portion or the entire portion thereof is included. The LSI may be referred to as an IC, a system LSI, a super LSI, or an ultra LSI, etc., depending on a degree of integration. Also, a method of integration is not limited to LSI, and may be realized by a dedicated circuit or a general purpose processor. Also, an FPGA (Field Programmable Gate Array), which is an LSI that can be programmed after manufacture, or a reconfigurable processor enabling connections and settings of the circuit cells in the LSI to be reconfigurated may be used. Further, in the case where another integration technology replacing LSI becomes available due to improvement of a semiconductor technology or due to the emergence of another technology derived therefrom, integration of the functional blocks may be performed using the above new integration technology. For example, biotechnology may be applied to the above-described integration.

Figure 11:
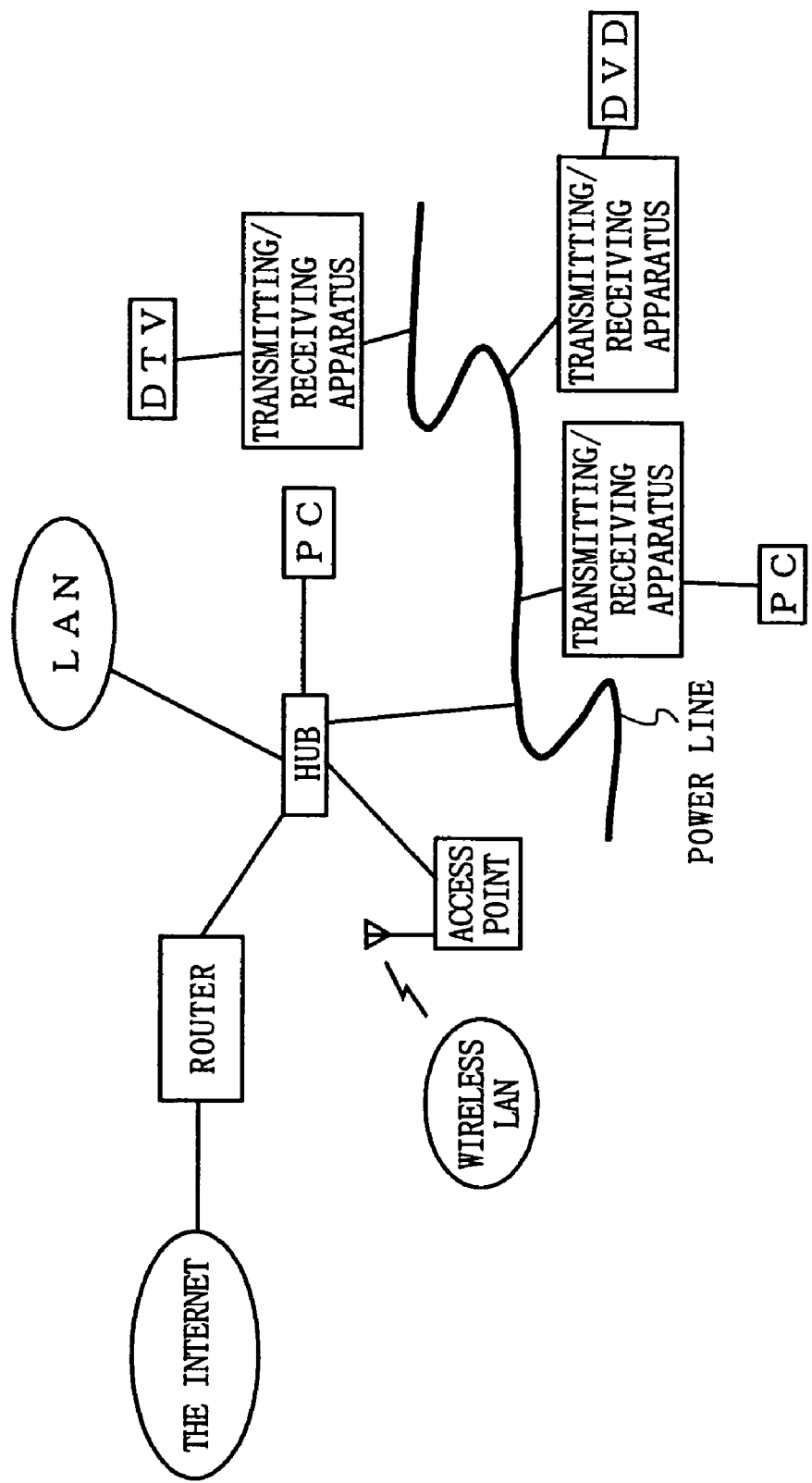
FIG. 11 is an illustration showing a structure of the entirety of a system in the case where the transmitting/receiving apparatus of the present invention is applied to a high-speed power line transmission.
Figure 12:
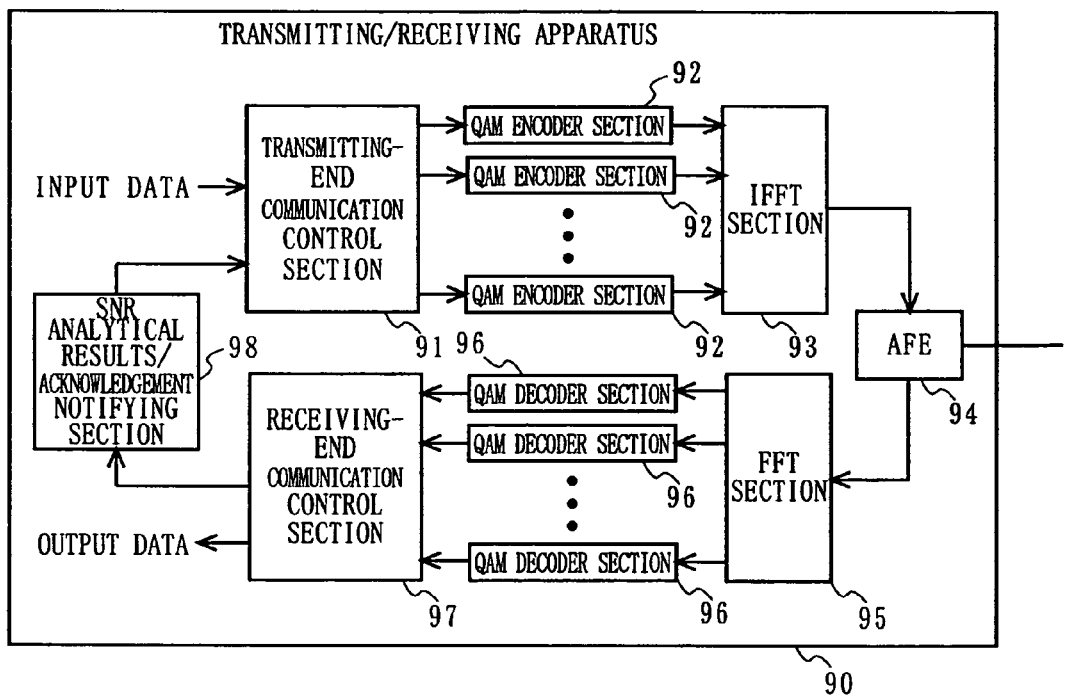
FIG. 12 is a block diagram showing a structure of a transmitting/receiving apparatus 90 defined by HomePlug1.0.
Figure 13A:
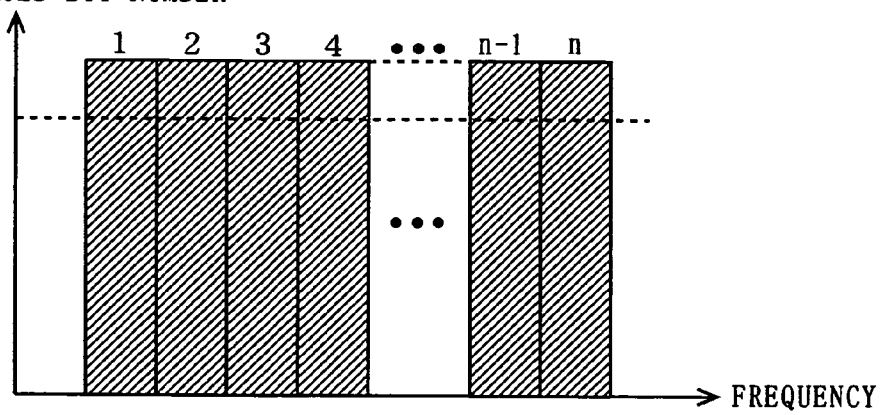
FIG. 13A is an illustration for describing a basic concept of DMT.
Figure 13B:
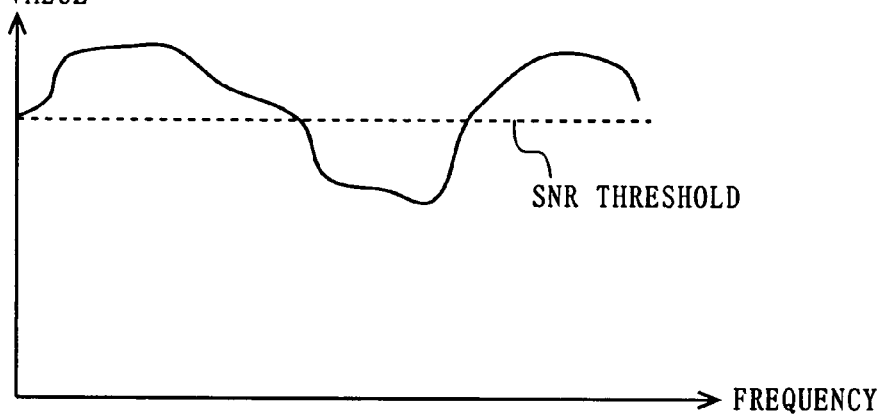
FIG. 13B is an illustration for describing a basic concept of DMT.
Figure 13C:
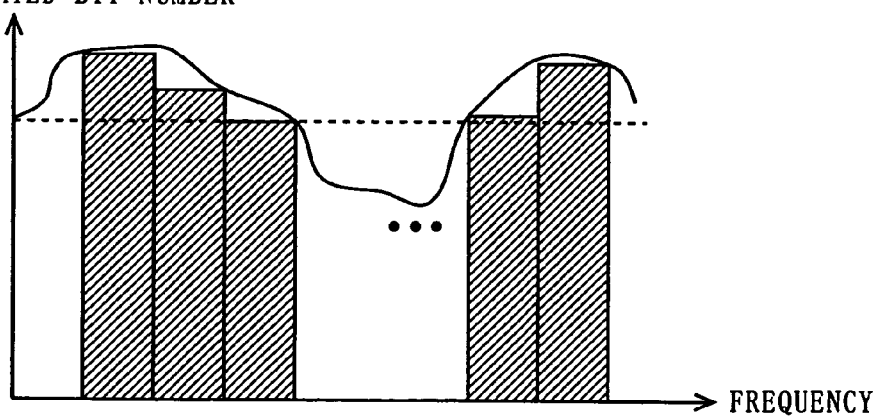
FIG. 13C is an illustration for describing a basic concept of DMT.
Figure 14:
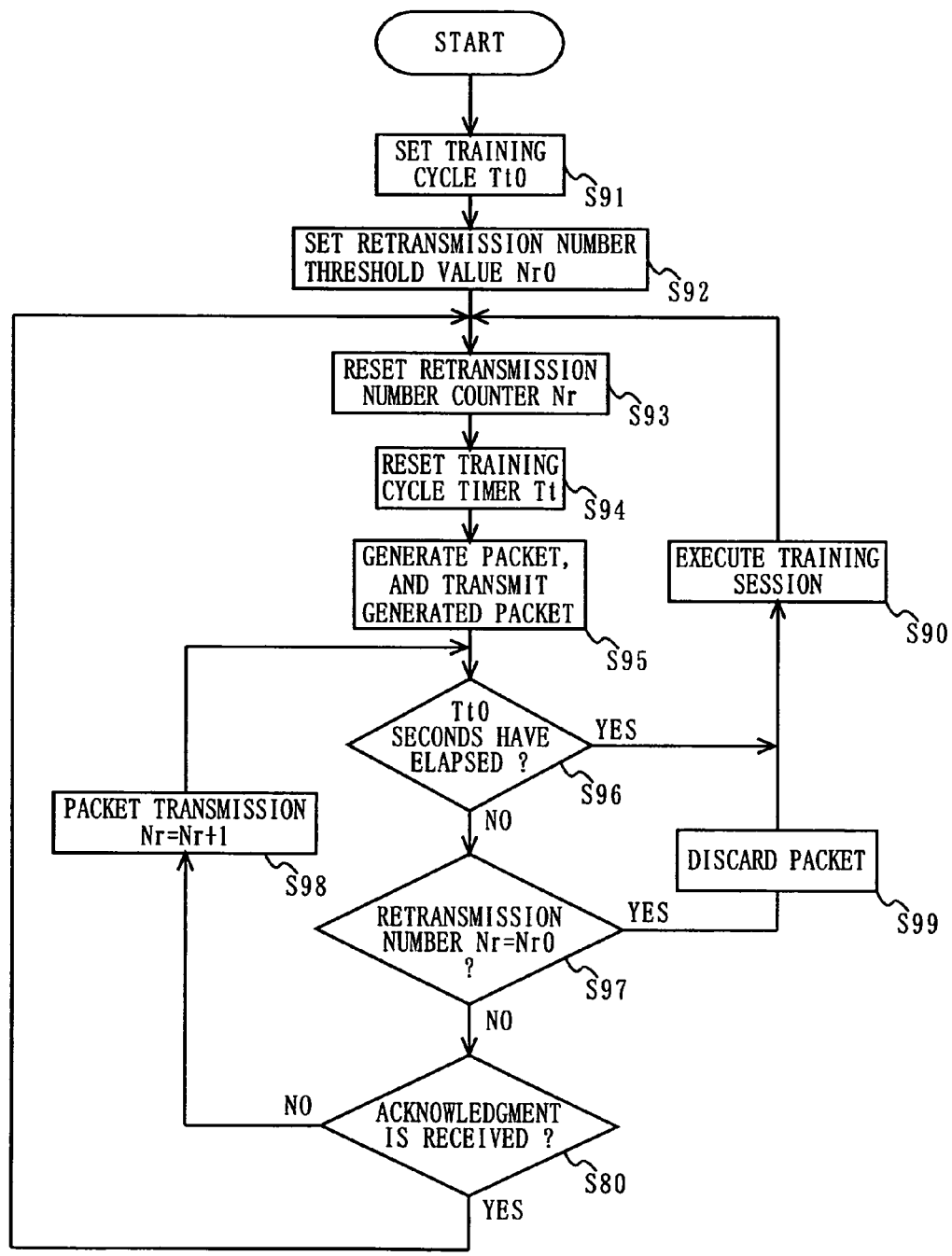
FIG. 14 is a flowchart showing an operation performed before a training session is started in a conventional power line communication system.

Hereinafter, an example to which each of the above-described embodiments is applied will be described. FIG. 11 is an illustration showing a structure of the entirety of a system in the case where the transmitting/receiving apparatus of the present invention is applied to a high-speed power line transmission. As shown in FIG. 11, the transmitting/receiving apparatus of the present invention provides an interface between a multimedia device such as a digital TV (DTV), a personal computer (PC), and a DVD recorder, etc., and a power line. An IEEE1394 interface, a USB interface, or an Ethernet (R) interface may be used as an interface between the multimedia device and the transmitting/receiving apparatus of the present invention. As such, a communication network system is configured to transmit digital data such as multimedia data at high speed via a power line. As a result, unlike a conventional cable LAN, it is possible to use a power line, which has already been installed in a home and an office, etc., as a network line without the need for installation of a network cable. Thus, the present invention can be easily installed at low cost, thereby substantially improving user-friendliness.

In the embodiment as shown in FIG. 11, the transmitting/receiving apparatus of the present invention is used as an adapter for converting a signal interface of an existing multimedia device to a power line communication interface. However, the transmitting/receiving apparatus of the present invention may be built into a multimedia device such as a personal computer, a DVD recorder, a digital video, and a home server system. As a result, it is possible to perform data transmission between the devices via a power cord of the multimedia device. It eliminates the need for wiring to connect an adapter and a power line, an IEEE1394 cable, a USB cable, and an Ethernet (R) cable, etc., whereby wiring can be simplified.

Also, the network system using a power line can be connected to the Internet, a wireless LAN, and a conventional cable LAN via a router and/or a hub. Thus, it is possible to extend a LAN system using the communication network system of the present invention without any difficulty.

Also, communication data transmitted over a power line by a power line transmission is received by an apparatus by directly connecting to a power line. As a result, it is possible to eliminate leakage and interception of data, which become a problem of wireless LAN. Thus, the power line transmission method is advantageous from a safety standpoint. It will be understood that data transmitted over a power line may be protected by an IPSec, which is an extended IP protocol, encryption of contents, other DRM scheme, and the like.

As such, it is possible to perform a high-quality power line transmission of AV contents by realizing copyright protection by the above-described encryption of contents, and by realizing QoS including prevention of data loss caused by a discarded packet, which is an effect of the present invention.

The transmitting/receiving apparatus of the present invention is able to prevent data loss while ensuring the maximum throughput in accordance with channel conditions. The transmitting/receiving apparatus of the present invention can be effectively used in a power line transmission and a wireless LAN communication, etc.

While the invention has been described in detail, the foregoing description is in all aspects illustrative and not restrictive. It is understood that numerous other modifications and variations can be devised without departing from the scope of the invention.

What is claimed is:

1. A transmitting/receiving apparatus for packetizing input continuous data and transmitting the packetized data to another apparatus on a communication network, and receiving a packet transmitted from another apparatus, comprising:
    a packet construction section for dividing the continuous data into a plurality of subpackets, and constructing a packet by concatenating the plurality of subpackets;
    a modulation transmission section for modulating the packet constructed by the packet construction section, and transmitting the modulated packet to another apparatus on the communication network;
    a training session execution section for checking channel conditions, when a predetermined condition is satisfied, by communicating with another apparatus, and changing a modulation rule used in the modulation transmission section so that a packet transmitted from the modulation transmission section is successfully transmitted to a transmission destination apparatus;
    a subpacket transmission confirmation section for confirming whether or not a subpacket included in the transmitted packet is transmitted successfully to the transmission destination apparatus; and
    a postbuffer for storing data transmitted from another apparatus, wherein
    if the modulation rule is changed by the training session execution section:
        the packet construction section reconstructs a new packet by concatenating a subpacket, which is confirmed as an unsuccessfully-transmitted subpacket by the subpacket transmission confirmation section, with subpackets newly generated from the continuous data, and
        the modulation transmission section modulates the reconstructed new packet in accordance with the changed modulation rule, and transmits the modulated packet,
    the data stored in the postbuffer is not readable if an amount of the data stored is smaller or equal to a predetermined threshold value, and is readable if the amount of the data stored exceeds the predetermined threshold value, and
    the data stored in the postbuffer is read, irrespective of the amount of the data stored, during an execution of a training session which is performed by the training session execution section for changing a modulation rule used in the modulation transmission section.

2. The transmitting/receiving apparatus according to claim 1, wherein if the subpacket transmission confirmation section confirms that at least one subpacket included in the transmitted packet is not transmitted successfully to the transmission destination apparatus,
    the packet construction section reconstructs a new packet by concatenating the at least one subpacket, which is confirmed by the subpacket transmission confirmation section as an unsuccessfully-transmitted subpacket, with subpackets newly generated from the continuous data, and
    the modulation transmission section modulates the reconstructed new packet, and transmits the modulated packet.

3. The transmitting/receiving apparatus according to claim 1, wherein the predetermined condition is satisfied when a number of packet retransmission performed by the modulation transmission section exceeds a predetermined upper limit.

4. The transmitting/receiving apparatus according to claim 1, wherein the predetermined condition is satisfied when a predetermined training cycle has elapsed.

5. The transmitting/receiving apparatus according to claim 1, further comprising a prebuffer for storing the continuous data to be input during an execution of a training session which is performed by the training session execution section for changing a modulation rule used in the modulation transmission section.

6. The transmitting/receiving apparatus according to claim 5, further comprising a wider bandwidth request section for requesting, when an amount of the continuous data stored in the prebuffer exceeds a predetermined threshold value, a management device, which manages a bandwidth assigned to a channel, to widen an assigned bandwidth.

7. The transmitting/receiving apparatus according to claim 6, wherein
    the management device assigns a bandwidth to each apparatus on the communication network in accordance with a reservation made by each apparatus, and the wider bandwidth request section makes a reservation with the management device so as to set a bandwidth faster than an input speed of the continuous data.

8. The transmitting/receiving apparatus according to claim 5, wherein if an amount of the continuous data stored in the prebuffer exceeds a predetermined threshold value, the transmitting/receiving apparatus sets a higher priority level to a packet, thereby transmitting the packet preferentially.

9. A method performed by a transmitting/receiving apparatus for packetizing input continuous data and transmitting the packetized data to another apparatus on a communication network, and receiving a packet transmitted from another apparatus, the method comprising the steps of:
   dividing the continuous data into a plurality of subpackets, and constructing a packet by concatenating the plurality of subpackets;
   modulating the constructed packet, and transmitting the modulated packet to another apparatus on the communication network;
   checking channel conditions, when a predetermined condition is satisfied, by communicating with another apparatus, and executing a training session to change a modulation rule so that a packet to be transmitted is transmitted successfully to a transmission destination apparatus;
   confirming whether or not a subpacket included in the transmitted packet is transmitted successfully to the transmission destination apparatus;
   reconstructing a new packet, if the modulation rule is changed by an execution of the training session, by concatenating a subpacket, which is confirmed as an unsuccessfully-transmitted subpacket, with subpackets newly generated from the continuous data;
   modulating the reconstructed new packet in accordance with the changed modulation rule, and transmitting the modulated packet;
   storing data transmitted from another apparatus;
   stopping reading of the data stored in the storing step if an amount of the data stored is smaller or equal to a predetermined threshold value, and allowing reading of the data stored in the storing step if the amount of the data stored exceeds the predetermined threshold value; and
   reading the data stored in the storing step, irrespective of the amount of the data stored, during said executing of the training session to change a modulation rule.

10. A non-transitory computer readable storing medium which stores a program causing a computer device to packetize input continuous data and transmit the packetized data to another apparatus on a communication network, and receive a packet transmitted from another apparatus,
   wherein the program causes the computer device to perform a method comprising the steps of:
      dividing the continuous data into a plurality of subpackets, and constructing a packet by concatenating the plurality of subpackets;
      modulating the constructed packet, and transmitting the modulated packet to another apparatus on the communication network;
      checking channel conditions, when a predetermined condition is satisfied, by communicating with another apparatus, and executing a training session to change a modulation rule so that a packet to be transmitted is transmitted successfully to a transmission destination apparatus;
      confirming whether or not a subpacket included in the transmitted packet is transmitted successfully to the transmission destination apparatus;
      reconstructing a new packet, if the modulation rule is changed by an execution of the training session, by concatenating a subpacket, which is confirmed as an unsuccessfully-transmitted subpacket, with subpackets newly generated from the continuous data;
      modulating the reconstructed new packet in accordance with the changed modulation rule, and transmitting the modulated packet; storing data transmitted from another apparatus;
   stopping reading of the data stored in the storing step if an amount of the data stored is smaller or equal to a predetermined threshold value, and allowing reading of the data stored in the storing step if the amount of the data stored exceeds the predetermined threshold value; and
   reading the data stored in the storing step, irrespective of the amount of the data stored, during said executing of the training session to change a modulation rule.

11. An integrated circuit for packetizing input continuous data and transmitting the packetized data to another apparatus on a communication network, and receiving a packet transmitted from another apparatus, comprising:
   a packet construction section for dividing the continuous data into a plurality of subpackets, and constructing a packet by concatenating the plurality of subpackets;
   a modulation transmission section for modulating the packet constructed by the packet construction section, and transmitting the modulated packet to another apparatus on the communication network;
   a training session execution section for checking channel conditions, when a predetermined condition is satisfied, by communicating with another apparatus, and changing a modulation rule used in the modulation transmission section so that a packet transmitted from the modulation transmission section is transmitted successfully to a transmission destination apparatus;
   a subpacket transmission confirmation section for confirming whether or not a subpacket included in the transmitted packet is transmitted successfully to the transmission destination apparatus; and
   a postbuffer for storing data transmitted from another apparatus, wherein
   if the modulation rule is changed by the training session execution section:
      the packet construction section reconstructs a new packet by concatenating a subpacket, which is confirmed as an unsuccessfully-transmitted subpacket by the subpacket transmission confirmation section, with subpackets newly generated from the continuous data, and
      the modulation transmission section modulates the reconstructed new packet in accordance with the changed modulation rule, and transmits the modulated packet,
   the data stored in the postbuffer is not readable if an amount of the data stored is smaller or equal to a predetermined threshold value, and is readable if the amount of the data stored exceeds the predetermined threshold value, and
   the data stored in the postbuffer is read, irrespective of the amount of the data stored, during an execution of a training session which is performed by the training session execution section for changing a modulation rule used in the modulation transmission section.

* * * * *